United States Patent [19]

Bryden et al.

[11] 4,208,657

[45] Jun. 17, 1980

[54] ELECTRONIC AUTOMATIC PLOTTER

[75] Inventors: Joseph E. Bryden, Framingham, Mass.; Ole J. Larsen, Birkeroed; Desmond O'Callaghan, Virum, both of Denmark

[73] Assignee: Raytheon Company, Lexington, Mass.

[21] Appl. No.: 934,147

[22] Filed: Aug. 16, 1978

[51] Int. Cl.² .............................................. G01S 9/02
[52] U.S. Cl. .................................................. 343/5 DP
[58] Field of Search .................................... 343/5 DP

[56] References Cited

U.S. PATENT DOCUMENTS

| | | | |
|---|---|---|---|
| 3,151,322 | 9/1964 | Hildebrandt | 343/5 DP |
| 3,403,396 | 9/1968 | Van Popta et al. | 343/5 DP X |
| 3,571,479 | 3/1971 | Horattas | 343/5 DP X |
| 4,068,233 | 1/1978 | Pease et al. | 343/5 DP X |

Primary Examiner—Malcolm F. Hubler
Attorney, Agent, or Firm—M. D. Bartlett; J. D. Pannone; H. W. Arnold

[57] ABSTRACT

A system for electronically producing and displaying target position history trails in a PPI radar. Digital target positions within a selected sector zone from all targets meeting predetermined amplitude and duration criteria are stored in a memory for single azimuth scans at predetermined intervals. The data from the scans are interleaved and read out of the memory for display with the real time PPI targets. When the memory is filled, the oldest plots from each target are dropped to make room for new plots.

15 Claims, 15 Drawing Figures

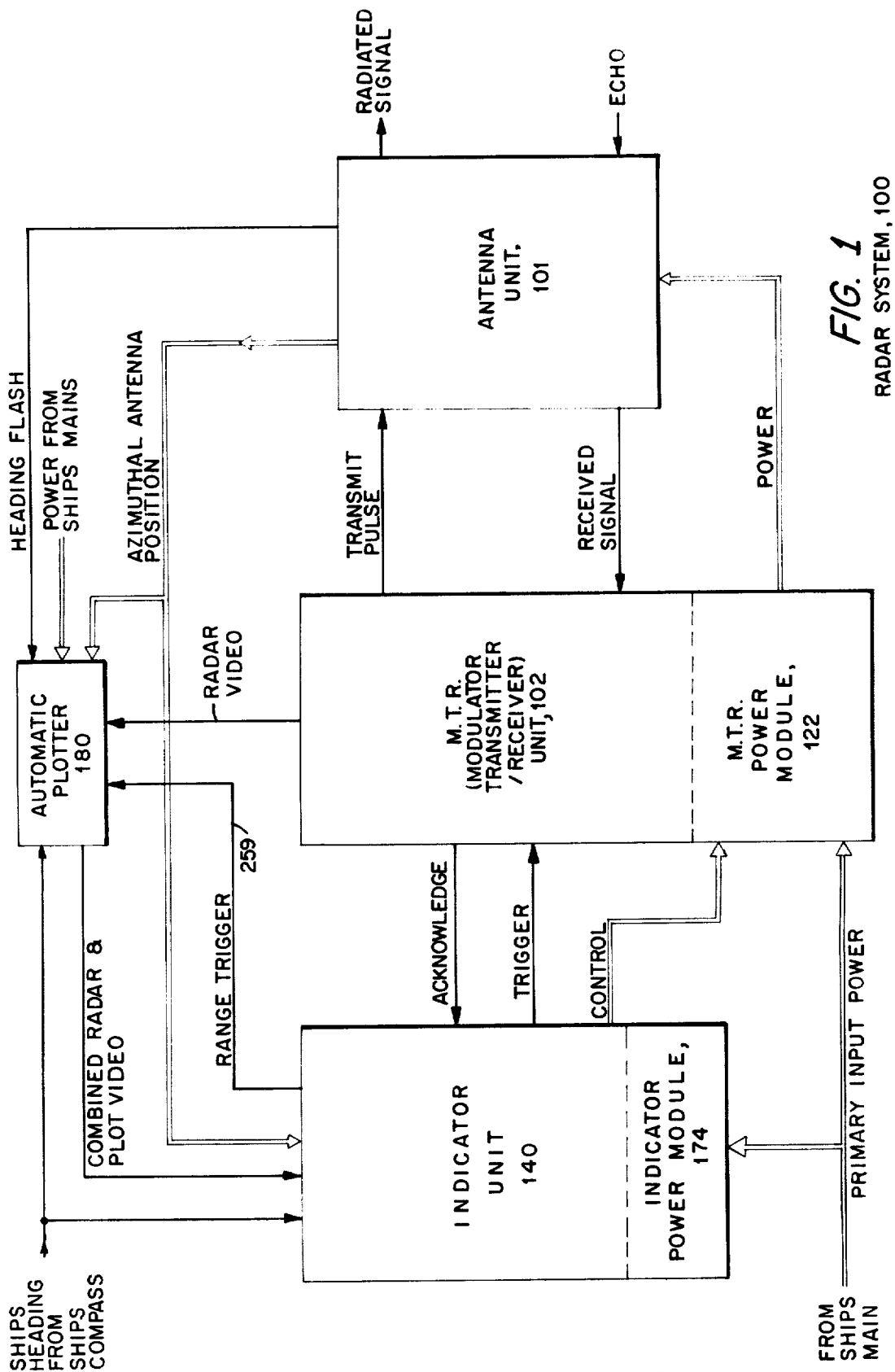

REAL TIME DISPLAY

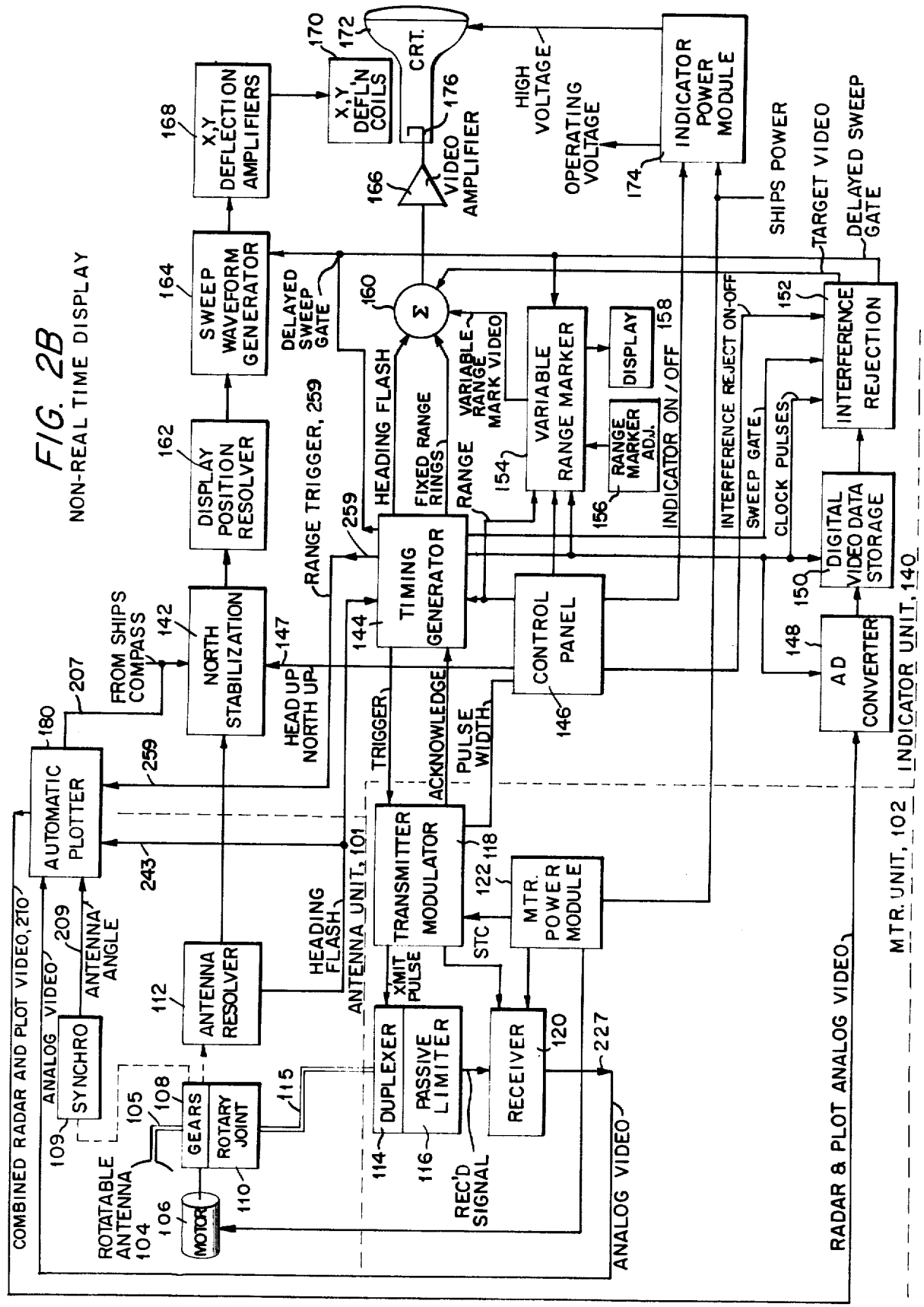

FIG. 3
PPI DISPLAY WITH PLOTTING
RADAR FREQUENCY : X BAND
RANGE: 12 NM
PLOT INTERVAL : 1 MIN.
LAPSED TIME : 6.5 MIN.
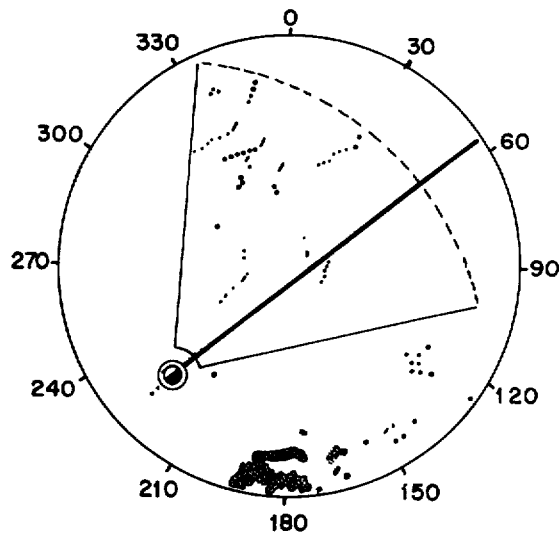
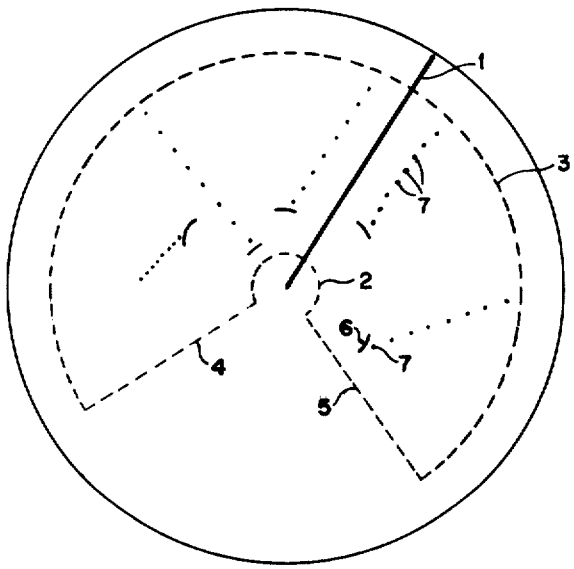
FIG. 4
RELATIVE PLOT PRESENTATION ON PPI
1. HEADING LINE
2. START RANGE
3. END RANGE
4. START AZIMUTH
5. END AZIMUTH
6. RADAR ECHO
7. PLOTS
FIG. 5
TRUE PLOT PRESENTATION ON PPI
1. HEADING LINE
2. START RANGE
3. END RANGE
4. START AZIMUTH
5. END AZIMUTH
6. RADAR ECHO
7. PLOTS
8. ZERO TIME MARKER
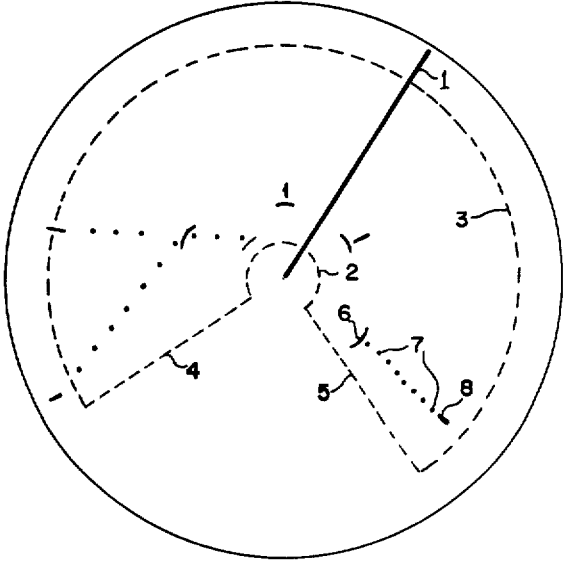

SITUATION BEFORE
USING ERASE

SITUATION AFTER
USING ERASE

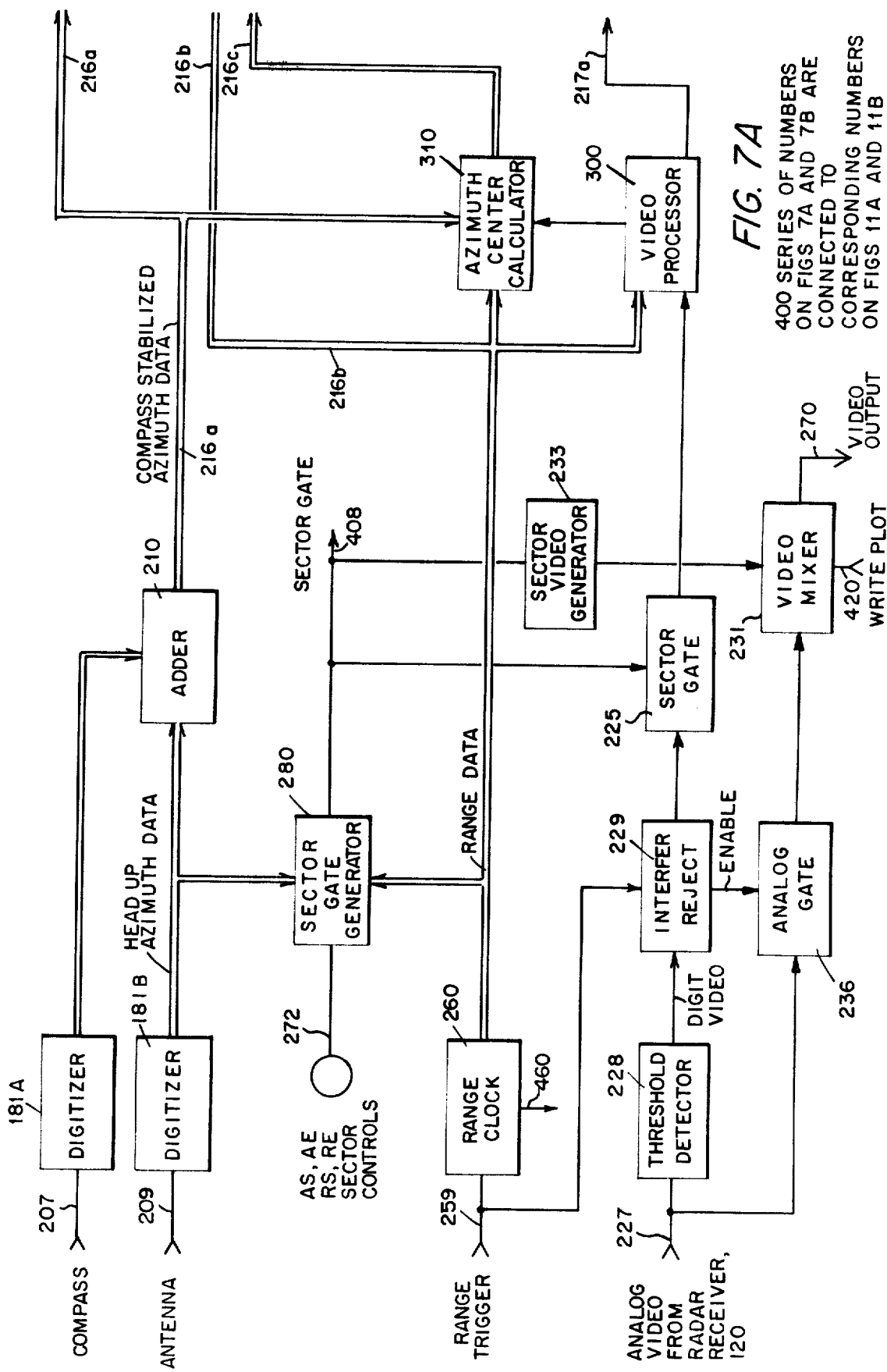

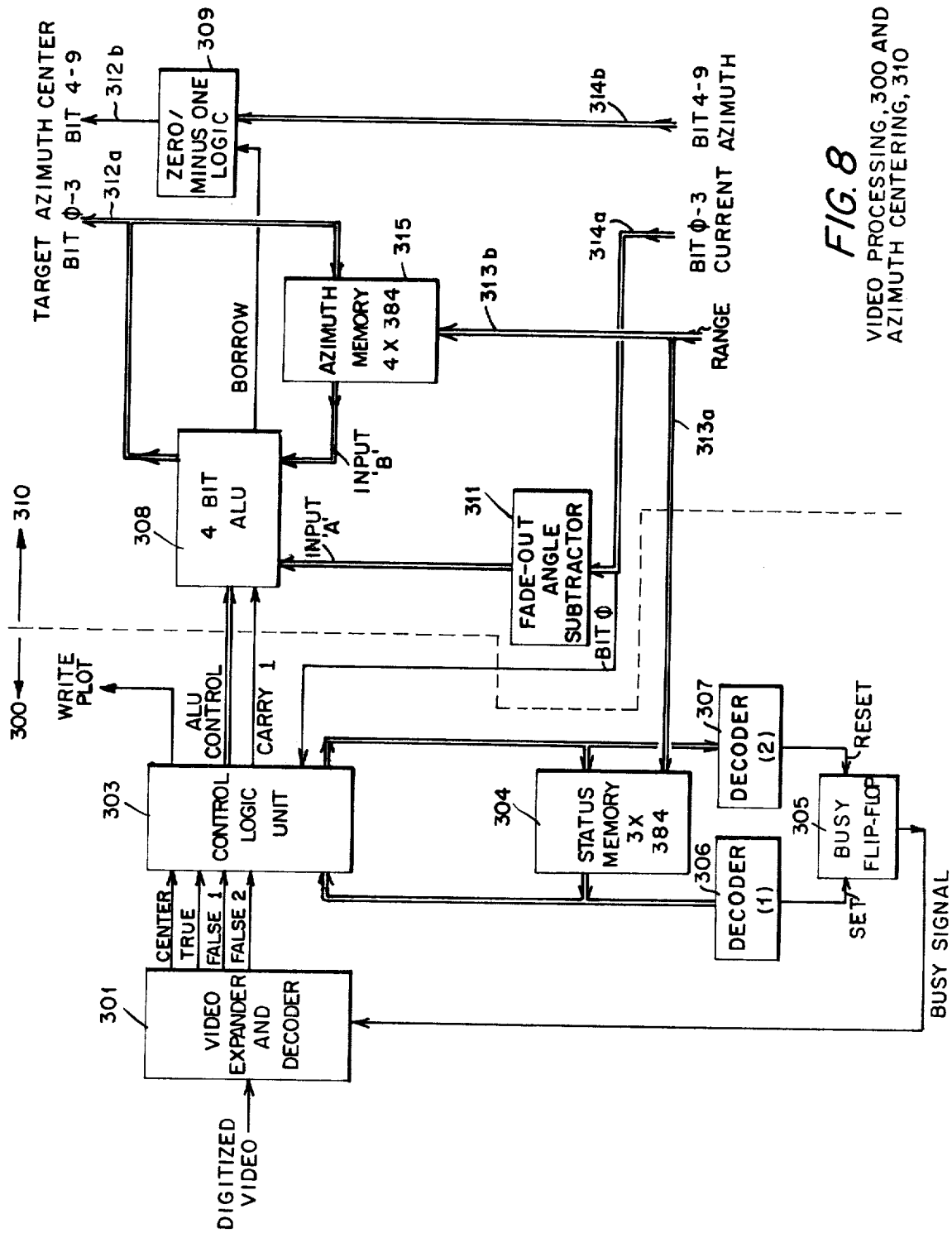

PLOT DETECTION SEQUENCE

VIDEO EXPANDER AND DECODER, 301

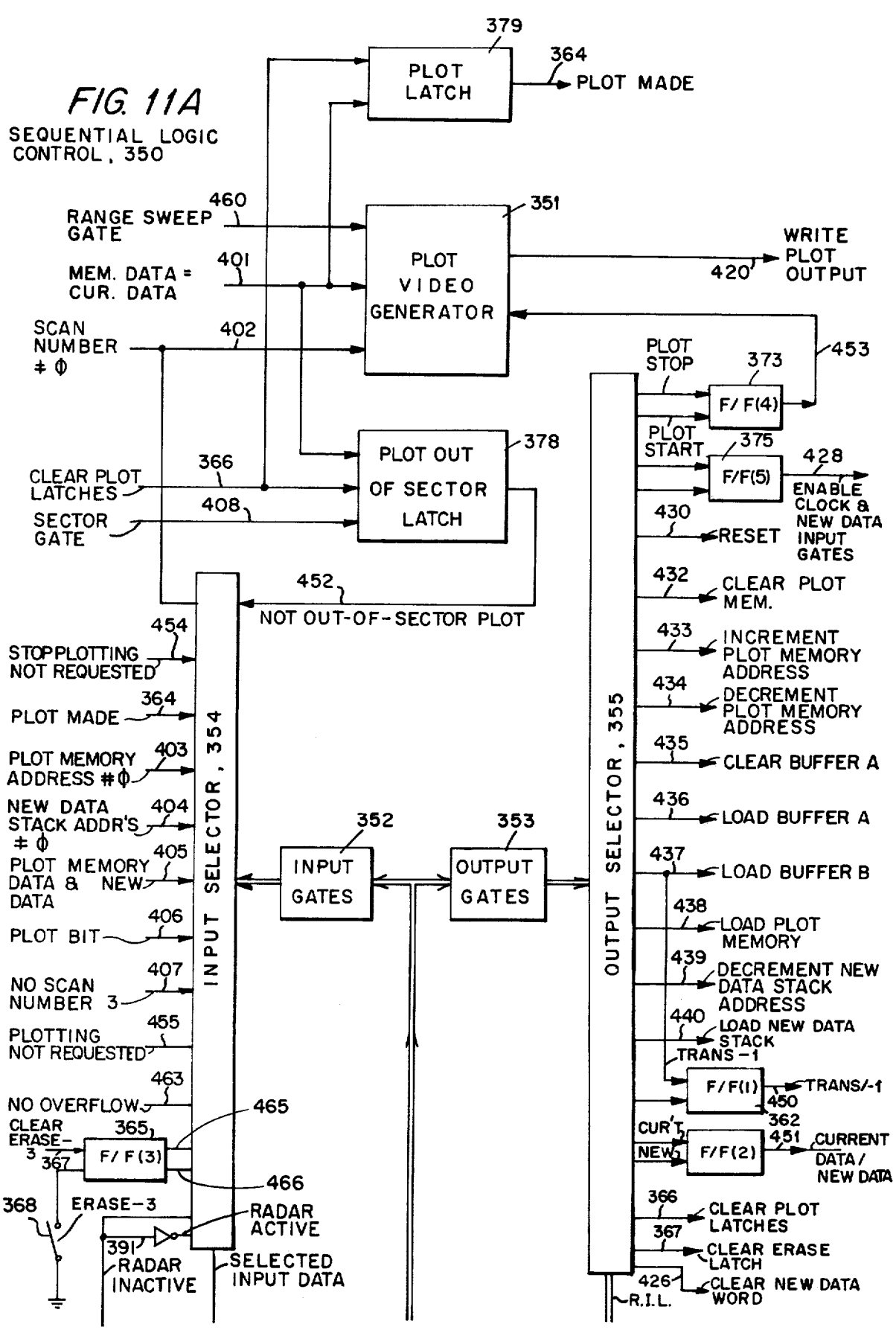

SEQUENTIAL LOGIC CONTROL, 350

ELECTRONIC AUTOMATIC PLOTTER

BACKGROUND OF THE INVENTION

This invention relates to automatic plotting systems and more particularly to those plotting systems used with mobile displays such as marine radar displays and the like.

In prior art radar systems, plotting of the tracks of other ships or vehicles is done manually. For example, the relative positions of other vehicles are marked on the faceplate of the radar display at intervals of time determined by the operator. Parallax errors are introduced by the distance between the plotting surface and the radar florescent screen. These errors may be eliminated by reflective plotters. However, reflective plotters usually create undesirable reflections which mask visibility and obstruct the use of the radar display. Futhermore, manual plotting, using a grease pencil, is time consuming and distracts the operator from other duties such as navigation of the ship. The situation is aggravated when there are many marine targets and accurate determination of their changing courses requires frequent plotting.

STATEMENT OF THE INVENTION

Accordingly, it is a major object of the present invention to provide an automatic visual record of the track of targets within a preselected area of concern.

A further object of the invention is to superimpose the visual record of the track of targets on a marine radar display surface simultaneously with the radar real time display, thereby avoiding parallax problems.

Another object is to provide an improved and readily visible display of multiple targets and their tracks for collision avoidance purposes.

A further object of the invention is to provide a simple automatic means for deleting those parts of the track which are too old to provide useful information and tend to clutter up the display.

In the present invention, means is provided for selecting radar target echoes falling within predetermined range and azimuth boundaries, means is also provided for further selecting these echoes according to a predetermined amplitude and pulse width. Timing means are then provided to gate the aforesaid selected echo signals returned for one full azimuth scan and repeated at predetermined intervals of time. Means are also provided for digitizing continuously the azimuth and range at which echo signals could be received. A first memory means is provided for storing the digitized range and azimuth of only the said gated echo return signals.

Means are provided for transferring from said first memory the said range and azimuth of accepted echo signals to a main memory which contains range and azimuth from previous gated azimuth scans. Said means tranfers range and azimuth in a novel manner such that new data is shuffled or interleaved with old data to maintain strict range and azimuth sequence corresponding to a real time sequence of signals. Furthermore, means are provided for comparing digitally said stored range and azimuth signals with current range and azimuth signals of said radar in which equality of digital numbers in range and azimuth of each, provide a plot video pulse adapted to be mixed with real time echo signals from the radar.

The invention further includes a means for decreasing the probability of noise being mistaken for a target echo. Means are also provided for obtaining only one response from multiple responses in consecutive range sweeps due to the width of the radar beam. To achieve this, echoes are received during a plurality of consecutive range sweeps at the same range to initiate target recognition. Subsequent returns from the same range during additional range sweeps are counted to obtain a predetermined number. During this counting, the target echoes are not entered into the memory as additional plots. On subsequent range sweeps, echoes at the same range are treated as new targets and target recognition is achieved as previously described. Thus, targets are recognized only once per beam width, avoiding multiple plots being stored for a single target position and reducing the amount of clutter on the screen.

A further feature of the invention includes the use of special marks adjacent to any given plot displayed or, replacing the plot itself by a characteristic or special mark. Typical uses of such marks include indication of the first plot of a particular target or the latest plot of the target. Also, a particular mark designating own ship can be adapted to move in true motion across the display.

In its broader aspects, the invention comprises a system for electronically producing and displaying target position history trails together with present target data on a radar PPI. This includes means for temporarily storing in a memory, coordinates of all targets within a selected zone having a predetermined amplitude and duration, and received during a single azimuth scan. Target data is temporarily stored from a single scan obtained at a predetermined interval after a previous set of scan data, and is transferred to a plot memory immediately after all target data from the single scan has been received. Means are provided during transfer interleaving the data from each scan with past stored data such that the data in the plot memory is in strict order of range and azimuth for display with present radar targets on a PPI.

BRIEF DESCRIPTION OF THE DRAWINGS

The invention, its objects and advantages, will be better understood from a consideration of the following description, taken in connection with the accompanying drawings in which:

FIG. 1 is a basic diagram of a radar system used in connection with the radar plotter of the present invention;

FIG. 2B is a block diagram of a radar system showing the transmitter and indicator units in which the echoes are digitized, stored and displayed at a different time together with the automatic plots of the invention.

FIG. 3 is a view of a typical PPI sector display with plotting and heading line;

FIG. 4 is a relative plot presentation of targets as seen on a PPI;

FIG. 5 shows a true plot presentation of the targets as seen on the PPI in FIG. 4;

FIGS. 7A and 7B is a block diagram schematic of the automatic plotter of the invention;

FIG. 8 is a block diagram of a video processor incorporated in the automatic plotter;

FIGS. 11A and 11B is a sequential logic controller associated with the automatic plotter.

DESCRIPTION OF THE PREFERRED EMBODIMENT

Figure 2A:
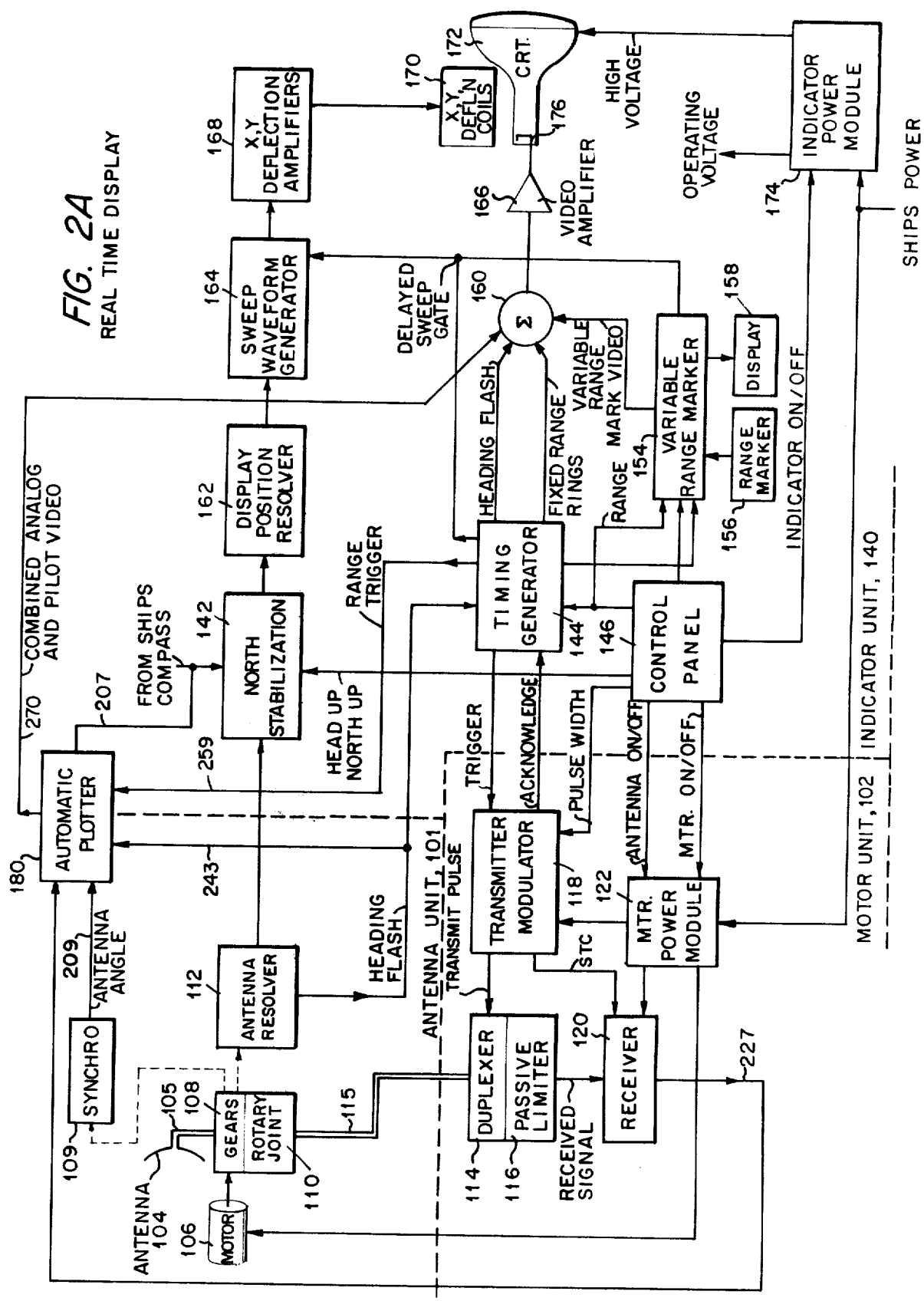
FIG. 2A is a block diagram of a radar system showing the transmitter, receiver and indicator units in which the echoes are displayed in real time in connection with the automatic radar plots of the invention.

Referring first to FIG. 1, there is shown a basic block diagram of a radar system used in connection with the radar plotter of the present invention. The radar system is constructed from three basic units: indicator unit 140, MTR (modulator-transmitter-receiver) unit 102 and antenna unit 101. Indicator unit 140 which provides the display of radar information and contains the operating controls of the system, is ordinarily mounted upon the bridge of the ship for easy access and convenience for use in navigation. Antenna unit 101 is in practice mounted as high as possible with an unobstructed path for the antenna beam to maximize the range of the unit. MTR unit 102 is located in weather-tight position as close as is practical to antenna unit 101 to minimize losses in the high-power transmit pulses coupled to antenna unit 101 and the low-level receive signals coupled from antenna unit 101 to MTR unit 102.

Indicator unit 140 and MTR unit 102 contain separate power modules 174 and 122 respectively. Both take the ship's power which may be 110 volts AC 60 Hertz or primary input power from any other normally provided source and convert it to DC voltages suitable for operating the various electronic circuits and electromechanical devices located within the two units. Additionally, MTR power module 122 supplies operating power to antenna unit 101 to the motor contained therein for rotation of the antenna. By providing separate power modules in each of the two remotely located major operating units, losses which occurred in previous units in the cabling between units are avoided. Moreover, with the present system, ON/OFF control of MTR power module 122 is accomplished from indicator unit 140 using only low signal level control voltages. Full control is therefore maintained at the indicator unit without large amounts of loss in long runs of cabling between units.

Each radar pulse cycle is initiated at indicator unit 140 by the production of an MTR trigger pulse which is coupled to MTR unit 102. Upon receipt of this pulse, MTR unit 102 produces a high-power transmit pulse. The transmit pulse is coupled to antenna unit 101 which radiates the signal outward in a narrow beam. Echo return signals from targets are received at antenna unit 101 and relayed to the receiver portion of the MTR unit 102. The receiver portion of MTR unit 102 amplifies and detects the received echo signals and produces a video signal through automatic plotter 180 to indicator unit 140. The commencement of the video signal is marked by an acknowledge pulse generated within MTR unit 102. Indicator unit 140 produces a visual display of the signals reflected back from targets in the path of the radar beam in accordance with the video signal. The azimuthal position of the radar antenna from antenna unit 101 and the ship's heading from the ship's compass are relayed directly to automatic plotter 180 and to indicator unit 140 to indicate the angle upon the display screen at which the returned radar signals are to be displayed. The automatic plotter 180 periodically stores range and azimuthal data for echo signals meeting predetermined zone and signal criteria. The data is acquired over one antenna scan; as the start and finish of the scan is determined by the heading flash. From these stored data, automatic plotter 180 generates video signals at the correct times on every azimuthal scan to produce plot marks at the correct positions on the display screen of indicator unit 140.

In the desired embodiment, automatic plotter 180 is self-contained and includes power supplies for direct operation from the ship's mains. In practice, automatic plotter 180 is a self contained option which may be used with different radar systems by simple wiring changes in the video signal line.

Referring next to FIG. 2A, there is shown a detailed block diagram of radar system 100 as shown in FIG. 1. Antenna unit 101 contains a rotatable antenna 104 capable of radiating and receiving signals within the frequency range of the radar pulses. Antenna 104 is rotatably connected to a set of gears 108 through a section of waveguide 105. Motor 106 is mechanically linked to antenna 104 through gears 108 and causes antenna 104 to rotate at a substantially constant and predetermined rate. Antenna resolver 112 is also linked through its input rotary shaft to gears 108 and antenna 104. Its input shaft is rotated preferably at the same rate as antenna 104.

Signals going to and coming from antenna 104 are coupled through rotary joint 110 within antenna unit 101 through waveguide section 115 to duplexer 114. Receiver signals are passed through duplexer 114 and passive limiter 116 to the input of receiver 120. Duplexer 114 isolates the transmit pulses produced by transmitter modulator 118 from receiver 120 and couples the receiver signals directly from waveguide 115 to the input of receiver 120 without substantial loss. Passive limiter 116 provides an absolute amplitude limit upon input signals to protect the input circuitry of receiver 120 from being overloaded from signals picked up from nearby radar transmitters.

Transmitter modulator 118 produces radar pulses in response to an input trigger signal from timing generator 144 within indicator unit 40. The PRF (pulse repetition frequency) of the transmitted radar pulses depends on the radar range scale setting; it is determined by the repetition rate of the MTR trigger signal produced by timing generator 144.

The width of pulses transmitted may also depend on the radar range scale setting. It may, for example, be desirable to use a narrower pulse on shorter range scales in order to obtain a greater resolution than would be possible using the longer pulses necessary to achieve an acceptable signal-to-noise ratio on the longer ranges. However, it has been found not necessary to provide a different pulse width for every possible range setting value. For example, in the preferred system embodiment of the invention, there are ten different range settings between 0.25 and 64 nautical miles. It has been found that only three different pulse widths of approximately 60, 100 and 500 nanoseconds are practically required. Only a two-bit digital signal then need be coupled between control panel 146 and transmitter modulator 118 to select among the three pulse widths. As there are many fewer pulse widths required than are range scale values selectable, many fewer lines or signals need be passed between timing generator 144 and transmitter modulator 118 than were needed in previous systems.

In previous systems a trigger pulse was generated within the MTR unit which was coupled to both the modulator and display circuitry. Because of certain characteristics of the most commonly employed modulators, the delay time between application of a trigger pulse and generation of the actual transmitted pulse may vary. This is especially true between ranges. Because of this unpredictable delay difference, targets in previously known radar systems would sometimes be displayed having an inaccurate leading edge caused by the sweep starting either too early or too late. With the system constructed for operation with the present invention, this problem has been eliminated.

Transmitter modulator 118 produces an acknowledge pulse at the commencement of each transmit pulse. This acknowledge pulse coupled to the timing generator 144 marks the beginning of the start of the radar sweep for each of the video signal processing circuits within indicator unit 140. Because the acknowledge pulse is precisely aligned with the commencement of each radar pulse, registration between adjacent sweep lines upon the display screen is maintained to a high precision. Thus, the actual on-set time of target return signals are accurately presented with no edge uncertainty caused by imprecise synchronization of the start of the display sweep with the actual transmitted pulse.

Transmitter modulator 118 also produces a sensitivity time control (STC) signal to control the gain with receiver 120. As is well known in the art, the STC signal is used to vary the gain of receiver 120 during each radar interpulse interval. For signals received from targets nearby, the gain is reduced. In this manner the amplifying circuitry within receiver 120 is prevented from being overloaded by the strong signals from nearby targets and a display having a substantially constant brilliance is produced.

The analog video produced at the output of the receiver 120 is filtered according to amplitude and duration criteria in automatic plotter 180. If the range and azimuthal data of acceptable signals meet predetermined zone criteria, the data are stored. From these stored data, automatic plotter 180 generates video signals at times to interleave with echo signals received in real time. These video signals are coupled with other video signals in summer 160.

Timing generator 144 furnishes clock and other timing signals used for the various circuits within indicator unit 140. An internal oscillator within timing generator 114 produces the clock pulses at predetermined periods. The heading flash from antenna resolver 112 which is produced each time the antenna beam passes the forward direction of the ship is reclocked by the clock pulses produced by the oscillator within timing generator 144 and coupled as a video pulse through video signal summer 160 to video amplifier 166 to produce a mark on the screen to indicate to the operator when the antenna beam so passes the bow of the ship. Timing generator 144 also produces the trigger signal as a pulse at predetermined fixed intervals depending upon the radar range scale setting as relayed from control panel 146. The acknowledge signal from transmitter modulator 118 is used by timing generator 144 to produce a sweep gate signal which is a logic signal which assumes the high or active state in the time period during which video signals are being received. The sweep gate signal is set in the active state as soon as the acknowledge signal is received and set to the low or inactive state at the end of the time period depending upon the range setting selected.

Upon control panel 146 are mounted the various operator actuated controls for adjusting and determining the operation of the various circuits within the radar system. A range control is provided that determines the maximum range at which targets are to be displayed. This distance corresponds to the distance at the edge of the cathode-ray tube screen. ON/OFF switches are provided for operating MTR power module 122, motor 106 of antenna 101 via MTR power module 122 and indicator power module 174.

The display shows the positions of all targets within the range of the radar, these positions may be rotated, with the ship's position at the center, to show either the heading of the ship toward the top of the screen (Head Up) or with the direction of North at the top of the screen (North Up). Other presentations are also possible by modifying the ship's heading data, for example, the direction of the planned course can be shown at the top of the screen. Switches are provided on control panel 146 to allow the operator to choose the form of presentation.

For generating displays in which true North is along a vertical line toward the top of the display screen, North stabilization unit 142 modifies the signals received from antenna resolver 112 before coupling them to display position resolver 162.

The North stabilization unit 142 consists of a differential resolver which is rotated by a well-known compass repeater to combine the ship's direction with the relative antenna position defined by antenna resolver 112.

Otherwise, for displays in which the ship's heading is displayed vertically on the screen, the signals from antenna resolver 112 are coupled directly to display position resolver 162. Display position resolver 162 takes the output signals from either antenna resolver 112 or North stabilization unit 142 in the form of a carrier modulated by the sine and cosine of the antenna angle relative to ship's heading or relative to North and produces therefrom DC voltages for each radar sweep representing X and Y sweep increments.

The ship's direction is combined with the antenna angle in the automatic plotter 180 to allow plot data to be stored in true bearing angles. Storing in true bearing angles avoids transient variation of bearing, due to yawing of the ship, being imposed on all targets. Plots are also read out of the automatic plotter 180 by way of line 270 and correctly mixed with the radar targets using true bearing data, regardless of whether the indicator is operating in Head Up or North Up mode.

In gear box 108 the antenna pointing angle is coupled to a single speed synchro 109. The three-phase AC output and reference lines of synchro 109 are converted by well-known electronic digitizer techniques to a 10-bit binary number representing 360 degrees of rotation of antenna 104. The ship's heading from the ship's compass is in the form of a three-phase output intended to drive a stepper motor by one step for ten minutes of arc rotation of the compass. A digital counter converts these incrementing steps into a binary number which is modified to be a best fit for a 10-bit binary number representing 360 degrees of rotation of the compass.

Sweep waveform generator 164 produces X and Y ramp waveforms, the maximum amplitudes of which are determined by the DC voltages from display position resolver 162. Generation of the two ramp waveforms commences at the time marked by the beginning of the delayed sweep gate signal from timing generator 144. The X and Y ramp waveforms are each coupled to X and Y deflection amplifiers 168 where they are amplified and coupled to X and Y deflection coils 170 for deflecting the beam of cathode-ray tube 172 in the manner well known in the art. The output of video amplifier 166 is coupled to cathode 176 of the cathode-ray tube 172 for modulating the beam intensity thereof.

The high voltage applied to the accelerating anode of cathode-ray tube 172 and all other operating voltages for the various circuits within indicator unit 140 including the voltages for biasing and operating all the logic circuits contained therein are provided by indicator power module 174. Indicator power module 174 is, as is MTR power module 122, preferably a switching power supply capable of producing at its output a plurality of voltages having the required current furnishing capabilities.

Referring next to FIG. 2B, there is shown an alternative detailed block schematic diagram of radar system as shown in FIG. 1. This system includes digital storage of video signals to allow echoes to be displayed at a sweep rate slower than would be obtained with a real time display. This display technique improves brightness, uniformity of brightness between radar ranges and accuracy of data displayed by the indicator unit 140. The basic radar system is similar to that previously described in conjunction with FIG. 2A. The rate at which samples are taken of the combined radar and plot analog video signal from automatic plotter 180 for digitization and the length of the time period from the start of the radar pulse during which the analog video signal is digitized are dependent upon the radar range scale setting. For the shorter ranges, a higher sampling rate and shorter time period are used.

The digitized video signal is read into digital video data storage memory 150 under control of clock pulses from timing generator 114. Digital video data storage memory 150 stores the digitized video signal from an entire radar interpulse interval. The range to which the signal is stored is, of course, dependent on the range scale setting. The digitized video signal is read out of the digital video data storage memory 150 for display upon cathode-ray tube 172 in a second time period also determined by the rate of clock pulses coming from timing generator 144. The second time period may be greater than or less than or the same as the first time period during which the video signal was read into digital video data storage memory 150. Readout occurs preferably immediately following the first time period and before commencement of the next succeeding radar time period. In preferred embodiments, the second time period is substantially constant and independent of the first time period. In this manner, with the constant readout time period, the writing or deflection rate of the beam of cathode-ray tube 172 is also constant so that the display produced is of constant intensity independently of the first time period. In this manner, with the constant readout time period, the writing or deflection rate of the beam of cathode-ray tube 172 is also constant so that the display produced is of constant intensity independent of the radar range scale setting. For short ranges, the second time period during which the digital signals are read out from digital video data storage memory 150 and displayed is substantially greater than the time period during which the signals were read in. Because of the increase in time period, the writing rate of the beam of the cathode-ray tube 172 is decreased over that which would be required should the video signal be displayed at the same rate at which it is received. Hence, the brightness of the display upon short ranges is greatly increased over that of previously known systems. The preferred manner of video signal digitization, storage and read out is described in U.S. Pat. No. 4,107,673, U.S. application Ser. No. 755,320 filed Dec. 29, 1976 which is a continuation of Ser. No. 612,882, filed Sept. 12, 1975 (now abandoned), which is a continuation of parent application Ser. No. 413,130 filed Nov. 5, 1973 (now abandoned) assigned to the present assignee, and which is hereby incorprated herein by reference.

Interference rejection circuit 152 is provided to nullify the interference effects caused by nearby radar transmitters operating within the same frequency band. This type of interference caused by reception of the transmitted pulses from a nearby radar, appears as plural spiral arms radiating outward from the center of the radar presentation. Interference rejection circuit 152 operates to substantially cancel this type of interference from the radar presentation without substantially affecting the presentation of desired targets. A switch is located upon control panel 146 which permits the operator to turn interference rejection circuit 152 ON and OFF as desired. The final video output signal produced at the output of interference rejection circuit 152 is coupled to video amplifier 166 via video signal summer 160. Interference rejection circuit 152 is redundant when the automatic plotter 180 is in operation because automatic plotter 180 includes an adequate interference rejection circuit. The redundancy in the present implementation allows normal use of the radar system without the automatic plotter 180, should it be required.

With reference to FIGS. 2A and 2B there is also provided a variable range marker circuit 154. Variable range marker circuit 154 produces an output video signal in the form of a shorter pulse for each sweep to display a circular range ring mark at a distance from the center of the radar display determined by the setting of range marker adjustment 156. Range marker adjustment 156 may physically be a part of control panel 146. A display device 158 provides a digital readout to the target upon which the variable range mark is positioned. The output variable range mark video signal from variable range mark circuit 154 is coupled to video amplifier 166 through video signal summer 160.

Figure 7B:
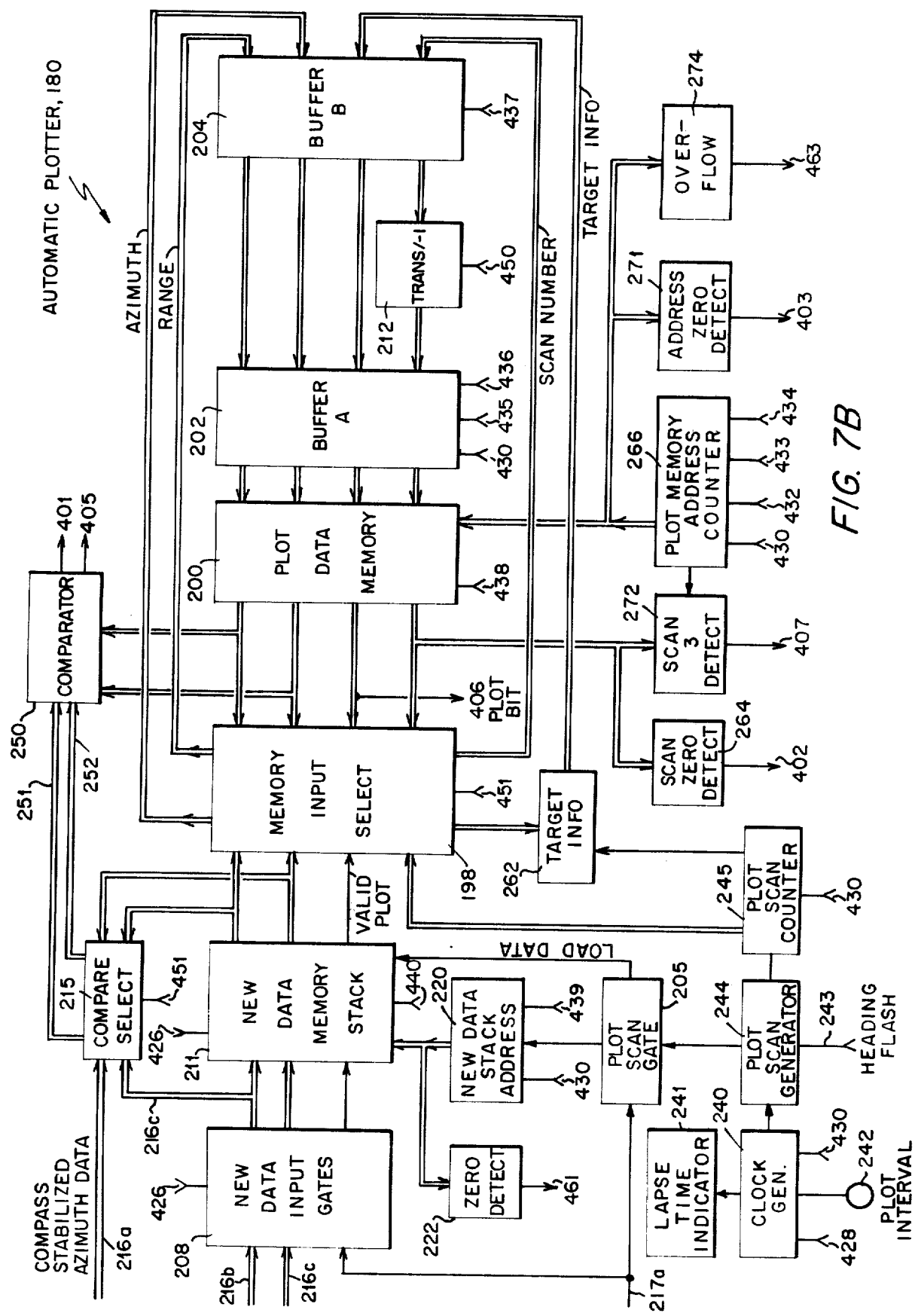

Referring now to FIGS. 7A and 7B a block schematic diagram of automatic plotter 180 is described to show the interrelationships between its functional components and the radar. Following this description, the functional components are described in additional detail.

It should be understood that all plotting data is stored relative to the ship in range, and in true bearing. (North=0°). Range is stored in automatic plotter 180 as a 9-bit word; the least significant bit (LSB), is equal to approximately 0.05 nautical miles. Azimuth is stored as a 10-bit word; the LSB is equal to approximately 0.35°. Range is digitized by measuring the time from trigger signal on line 259 from the radar timing generator 144 of FIG. 2, by counting time intervals with a binary counter (not shown) in range clock 260. The count is the digital number which indicates the present delay time for receiving an echo after the transmitter pulse.

Referring to the automatic plotter of FIGS. 7A and 7B and the radar systems of FIGS. 2A and 2B, the true bearing of the target is obtained by adding the 10-bit binary number representing the antenna pointing angle relative to the bow of the ship, to a 10-bit binary number representing the ship's heading which is obtained from the ship's compass.

Figure 6A:
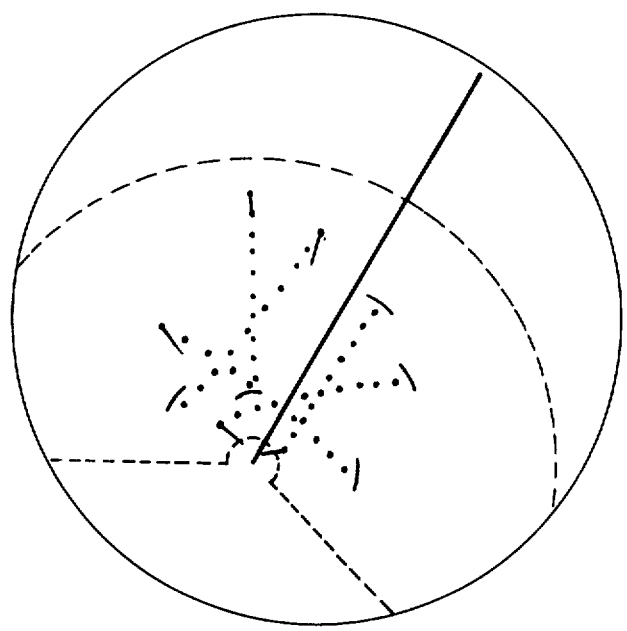
FIG. 6A shows targets plotted on a PPI before using Erase-3.
Figure 6B:
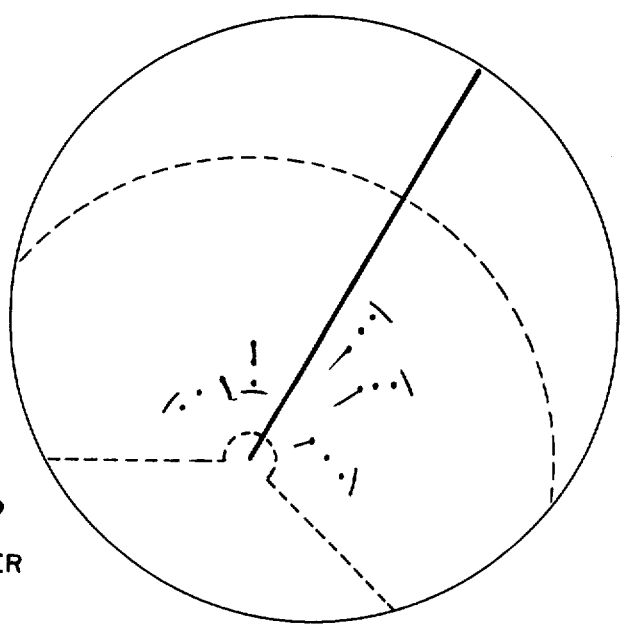
FIG. 6B shows the effect of using a selected Erase-3 on the targets shown plotted on the PPI of FIG. 6A

Raw video from receiver 120 of FIG. 2A is tested for validity by amplitude threshold detector 228, interference rejector 229, within plotting sector gate 225, all contained within automatic plotter 180. Valid video signals are then processed, by video processor 300, for pulse width to discriminate echoes typical of ships as seen in FIG. 3 from echoes typical of land masses. FIG. 4 shows a relative plot presentation on PPI 172 comprised of the following components: heading line (1) proceeds from the start of the range sweep. The boundaries of the chosen sector for plotting are indicated by dotted lines. Range starts from (2) and ends at (3). The azimuth boundaries of the plotting sector are (4) and (5). A typical radar echo covering several degrees of azimuth due to antenna beam width is shown at (6), preceeded by its plot (7). FIG. 5 identifies the components of a true plot presentation (with North up and all targets shown relative to a stationary frame of reference) in a manner similar to that of FIG. 4 with corresponding numbers referring to corresponding identifications. FIGS. 6A and 6B illustrate the effect of the Erase-3 control feature of the invention which allows all plots except the three most recent ones of each track to be erased.

From a series of echoes received from successive range sweeps the center azimuth is determined by a logic sequence in video processor 300 in conjunction with center calculator 310 of FIG. 7A and a write plot signal is generated. This write plot signal causes range and azimuth data (19-bits) to be transferred through new data input gates 208 for storing in new data memory stack 211 of FIG. 7B. Thus, one radar antenna scan through a set of targets such as the radar echoes (6) shown in FIG. 3, generates a complete set of new plots to be stored in the new data memory stack 211.

The purpose of new data input gates 208 is to provide zero data input to new data memory stack 211 on command from sequential logic controller 350 through line 426. There are two conditions when zero data input is required. First, during reset and stop plotting routine, clock generator 240 is inhibited through line 428 and the data in new data memory stack 211 is cleared through line 426, one address at a time under control of line 440. Second, during data transfer routine the data is cleared from new data memory stack 211 after it has been transferred to plot data memory 200, one word at a time.

Clock generator 240 includes a 10 MHz quartz crystal oscillator and provides stable frequencies for lapse time indicator 241, for generating the time interval between acquisitions of new plots, and in conjunction with a heading flash signal on line 243 determines the acquisition scan interval in plot scan generator 244. Plot scan generator 244 activates plot scan gate 205 which allows valid data to be loaded into new data memory stack 211. The time interval required between plots is selected by means of plot interval selector 242; in the preferred implementation these plot intervals are 0.25, 0.5, 1.0 and 3.0 minutes. New data scans are counted in scan counter 245 and the count is associated with the data to identify its age; the count is a 7-bit number. Lapse time indicator 241 is reset when plotting is terminated.

Data, including the scan count, is transferred from the new data memory stack 211 to a separate plot data memory 200 by way of a memory input select 198. All radar position data stored in the plot data memory is in strict order of magnitude, based on the 19-bit data word which has azimuth data occupying the positions of the ten bits having the largest numerical value and range occupying the nine bits of least value. New data from the stack 211 is interleaved with all data in plot data memory 200 aided by buffer A 202 and buffer B 204 to be described. Transfer is made during the down time at the end of each range sweep. All data retained in the plot data memory 200 is sequentially accessed during each PPI sweep and compared in a comparator 250 of FIG. 7B with current azimuth and range data on lines 251 and 252 from compare select 215 which connects to the current azimuth data on line 216a and current range data on line 216b. When the data to the comparator 250 are the same, a signal is sent to the sequential logic controller of FIGS. 11A and 11B where a plot signal is generated. The plot signal is mixed with the radar video signals in video mixer 231 of FIG. 7A.

The boundaries of the active plotting sector as seen in FIGS. 4, 5, and 6 are generated by video signals obtained by comparing for equality the selected sector parameters with current antenna angle data from digitizer 181a and current range data from range clock 260 of FIG. 7A. These sector boundary signals are also mixed with radar video signals in video mixer 231.

It should be understood that plots may be erased by removing data from the plot data memory 200. This is accomplished in an orderly manner by removing data associated with the earliest plot scan count in plot data memory 200 and then reducing, by one, the stored scan count numbers of the remaining data. With each data removal, the memory is repacked to remove spaces between the data caused by erasure. There are four conditions which call for data erasure. First, during start up when all memory addresses must be cleared. Second, by operator command, referred to and described later as Erase-3, all data except that associated with the three most recent counts, is cleared; the operator may use this function for clearing the screen of superfluous plots. Third, when all memory addresses are filled, the data having the first scan count (0) is automatically erased to make room for new data. Fourth, when a plot is outside the active plotting sector it is deleted from the memory.

From the above description it is appreciated that the automatic plotter is cycled through writing, reading and erase conditions, each of which has specific routines. The appropriate control is embodied in sequential logic controller 350 of FIGS. 11A and 11B, to be described later.

Again, referring to the automatic plotter 180 of FIGS. 7A and 7B there are two digitizers 181A and 181B which accept compass and antenna data respectively on lines 207 and 209; the antenna data is from single speed synchro 109 of FIG. 2. The electronic digitizer 181A is available for converting the signals from synchro 109 into 10-bit binary numbers. For converting compass data which defines the ship's heading, typically the data signals on line 209 are three-phase and are intended to drive a stepper motor (not shown) by one step for either ten or twenty minutes of arc of the compass. Electronic digitizer 181B in automatic plotter 180 is based on counting the number of steps, clockwise or counterclockwise, commanded by the system compass (not shown). The binary number obtained by adding compass and antenna binary numbers in adder 210 represents the true pointing angle of the antenna 104. The addendum from adder 210 is 10-bits and modulo 360°.

Range, on the other hand, is measured by elapsed time from the trigger signal on line 259, from timing generator 144 of FIG. 2A or 2B to the echo signal. Range clock 260 consists of a stable quartz crystal oscillator frequency divider circuit and a 9-bit binary counter. The counter is enabled by the trigger signal.

For approximately 316 microseconds, following the trigger signal the 9-bit binary counter is incremented by a 1.618 MHz clock derived from the stable oscillator. Thus, the binary number is incremented by one bit in the time interval equivalent to 0.05 NM. The sector gate boundaries, as shown for example in FIGS. 3 and 4, are defined and generated relative to the ship's position and heading. Manually selected inputs 272 define start azimuth, end azimuth, start range and end range. In the sector gate generator 280, the angles are retained in two 10-bit counters and the ranges in two 9-bit counters, all counters being conventional. Intially, the start of the azimuth boundaries are automatically set at 110° port and 110° starboard of the heading line as seen in FIGS. 3 and 4 and the range boundaries are set at 0.5 and 12 nautical miles. During operational set up, these counters are incremented by pulses under the control of the up/down incrementing buttons on the control panel to place the boundaries in any required position. Between the azimuth limits, dotted line arcs are drawn by video signals generated at the start and end ranges, as seen in FIG. 3. Between range limits straight dotted lines are drawn by video signals generated during sweeps at start and end azimuths. A sector gate 225 of FIG. 7A is opened when both start azimuth and start range numbers are exceeded by current data and closed when either end azimuth or end range numbers are exceeded. The sector gate 225 allows only targets within the sector to be plotted.

Raw video received on line 227 from receiver 120 of FIG. 2A or 2B branches to threshold detector 228 and to analog gate 236. The threshold detector 228 converts all signals equal to or exceeding a predetermined level into single level video signals of a digital form for use by the interference rejector 229.

The interference rejector 229 validates a video signal if a signal occurs at the same range on three consecutive range sweeps. This is accomplished by storing video pulses of consecutive 52 NM range sweeps alternately in two 1024-bit shift registers. The video is clocked into the shift registers at 0.628 microsecond intervals, starting from the radar trigger. To ensure that the video pulse overlaps a clocking pulse, all video pulses are stretched prior to the input of the shift register to at least, one microsecond duration. The current video signals are compared with the signals stored in the cells corresponding to the same range of the previous two sweeps. If all three signals are present a new digital video pulse is generated. Furthermore, analog gate 236 is opened to allow raw video to proceed to an additive video mixer 231.

Interference rejector 229 includes control and clocking logic (not shown). Clock signals are derived from a 25 MHz crystal oscillator, and signals are correctly timed into the shift registers as determined by the onset of the trigger pulse.

The digitized video signal from interference rejector 229 is only passed for further processing if it originated from a target within the accepted plotting sector boundaries. This gating function is controlled by the sector gate 225 which in turn is controlled by signals from the sector video generator 233 of FIG. 7A previously described.

Again referring to FIG. 7A, video processor 300 and azimuth center calculator 310 combine to recognize the relationships between data received from closely spaced range and azimuth addresses. These relationships are used to reject land masses and to obtain single addresses per target although the radar gives a multiplicity of responses due to the radar beam width. FIG. 8 is a more detailed block schematic showing the interrelations between video processor 300 and azimuth center calculator 310, which will be described in functional detail after a brief description. In operation, land rejection is performed in two steps. First, targets exceeding a range width of 3.2 microseconds are inhibited in the control logic unit 303. Second, targets not exceeding 3.2 microseconds initiate the plot detection sequence and azimuth center calculation. If video is detected around the target both in range and in azimuth in a certain pattern, the initiated plot is considered as being part of land echoes and therefore rejected. Once a target has been detected as being land, a flip-flop disables all further plotting in that range sweep to avoid plotting land based single targets. The flip-flop is cleared with the next radar trigger.

Target azimuth center calculation commences when the plot detection sequence is initiated. Calculation commences with the clearance of a 4-bit word in azimuth memory 315. During the period while a target continues to be seen, the 4-bit word is incremented by one each time the current azimuth least significant bit is changed from low to high. The 4-bit word in azimuth memory 315 is equal to one half the azimuth width of the target at any time. When the target period is not seen anymore, the updating of the 4-bit word stops, and the circuit goes into fade-out mode. The purpose of this is to check for any further targets appearing at that range in a guard-band azimuth angle. If not true, the 4-bit word from azimuth memory 315 plus the fade out angle from fade-out angle subtract unit 309 is subtracted from the current azimuth on lines 314a and 314b, thus providing the azimuth center of the target on lines 312a and 312b.

The method of achieving these functions will now be described in more detail. Digitized video from sector gate 225 is supplied to the video expander and decoder 301. The expander consists of a 12-bit shift register and the decoder generates the following control signals: CENTER, TRUE, FALSE 1 and FALSE 2, by the arrangement shown in FIG. 9.

Figure 9:
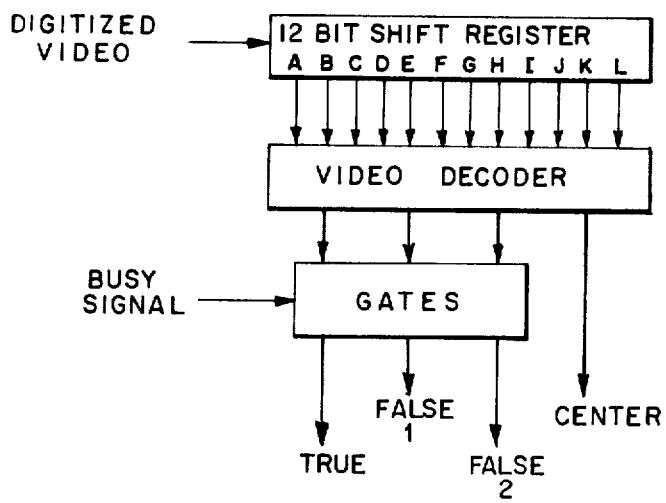
FIG. 9 is a schematic of the video expander and decoder of FIG. 8.

In the video decoder of FIG. 9 the following logic functions are resolved to generate the control signals:

CENTER
is used to initiate a plot detection sequence. CENTER can only be generated if the target is less than six range cells wide, thus providing pulse width discrimination.

Logic equation for CENTER is
$F.(\overline{D}E\overline{G}H + \overline{D}E\overline{G}\overline{H} + \overline{D}EG\overline{H} + DEG\overline{H} + DEGH).\overline{A}\overline{B}\overline{C}\overline{I}\overline{J}\overline{K}\overline{L}$ TRUE
is used to detect the target during the plot detection sequence. If a target is only one range cell wide, it could be placed in the neighboring range cells of the first one (CENTER).
Logic equation for TRUE is
E+F+G

FALSE 1
is used to detect if any targets are present closer than six range cells to the CENTER during the plot detection sequence.
Logic equation for FALSE 1 is
A+B+C

FALSE 2
has the same purpose as FALSE 1.
Logic equation for FALSE 2 is
I+J+K+L Status memory 304 of FIG. 8 consists of three 384-bit shift registers. Information of current operation is stored as three bits in a single 3-bit range cell.
The following status codes are used:

| | | |
|---|---|---|
| 000 | no operation | |
| 001 | lock inhibit | |
| 010 | write plot | |
| 011 | fade-out | |
| 100 | fade-out | Plot detection sequence codes |
| 101 | pending/check | |
| 110 | pending/check | |
| 111 | target on | |

In control logic unit 303 the status generated in the previous sweep is compared with new outputs from video expander and decoder 301 to generate a new status code and act accordingly. The status is also decoded for status 000 and 001, both on input and on output of status memory 304. Busy flip-flop 305 will be set of status 111, 110, 101, 100, 001 or 010 is present on input of status memory 304. The decodings for these conditions are done by decoder (1) 306 and decoder (2) 307. The busy signal is used to enable TRUE and FALSE signals from the video decoder to the control logic unit 303, as these signals are only of interest if a plot detection sequence has been initiated.

Figure 10:
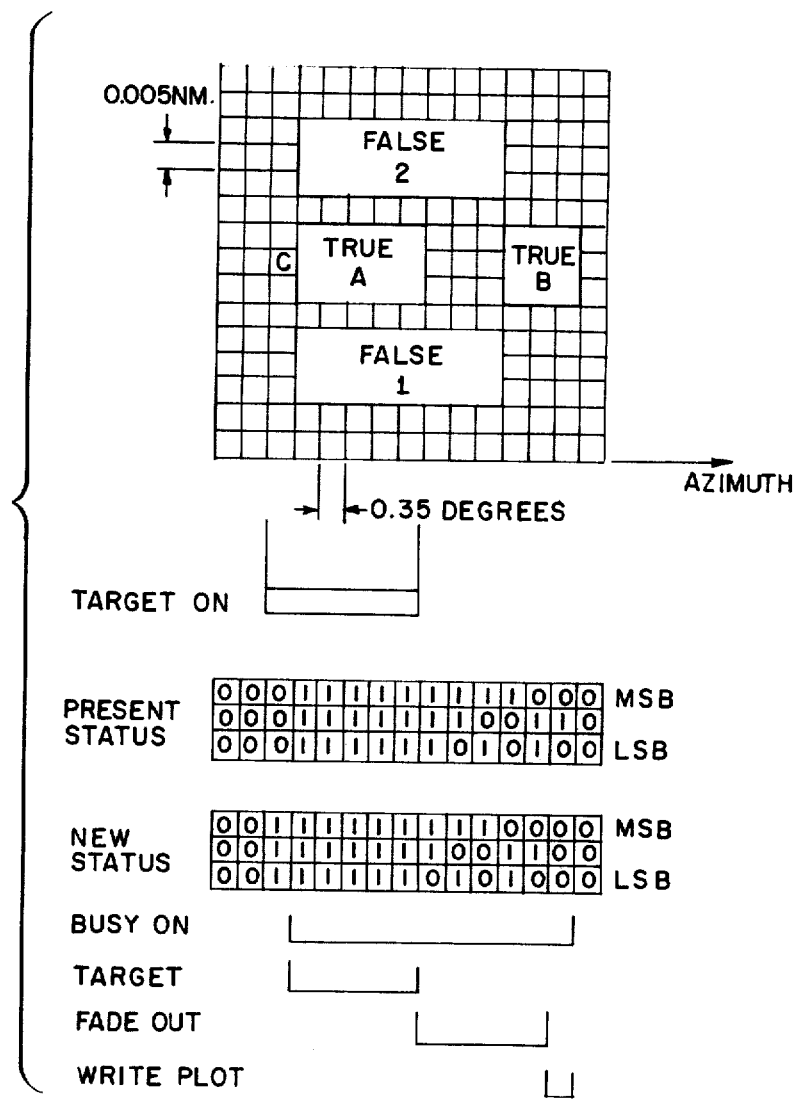
FIG. 10 is a diagram showing a plotting sequence demonstrating the operation of the control logic of FIG. 8.

With the aid of FIG. 10 the operation of a normal plot detection sequence will be described:

If target is less than 3.2 microseconds wide, video expander and decoder 301 will generate CENTER signal (c). Because status for that range cell is 000, the plot detection sequence is started, and status is changed to 111. At the next azimuth the busy flip-flop 305 will be set, enabling TRUE and FALSE signals from video expander and decoder 301. If the combination is correct, status continues on 111 as long as the target is seen. When the target disappears, the fade out sequence starts and concludes with the write plot.

The following conditions will result in a locked plot-inhibit mode:

(a) if two more targets appear, one in FALSE 1 and the other in FALSE 2 at the same time, this target configuration is considered as being land, therefore plotting is inhibited. This function is land rejection in range, and its equation is:
(status 111+status 110+status 101).(FALSE 1.FALSE 2)

(b) if another target appears in the TRUE B area, this target configuration is also considered as being land, and again plotting is inhibited. This function is land rejection in azimuth and its equation is:
(status 100+status 011+status 010).(TRUE)

(c) if the duration of target plus the fade-out sequence exceeds a certain angle the plotting is inhibited. This function is also land rejection in azimuth.

(d) if a single target appears either in FALSE 1 or FALSE 2 during status 111 through 010, it is considered as being another real target close to the first one. This will not cause plot inhibit, but the second target will not be plotted. The locked plot-inhibit mode will be cleared when the following equation comes true:
(status 001)×($\overline{\text{FALSE 1}}$).($\overline{\text{FALSE 2}}$).($\overline{\text{TRUE}}$)

Proceeding to azimuth center calculator 310, the objectives of the center calculation are:
(a) To have a single azimuth address for a single target; and
(b) To have a center value for azimuth address.

Referring to FIG. 8, the azimuth center calculation is performed by azimuth memory 315 (four 384-bit shift registers), a 4-bit arithmetic logic unit (ALU) 308, zero/minus-one logic 309 and a fade-out angle subtractor 311. The ALU 308 is a commercial TTL package (such as TI, SN74S381) that performs eight binary arithmetic operations on two 4-bit words (A and B). These operations are:
(a) Clear (outputs low)
(b) A or B
(c) A plus B
(d) B minus A
(e) A and B
(f) A or B, exclusive
(g) A minus B
(h) outputs, preset high.

During a plot detection sequence ALU 308 modifies a 4-bit word circulating in azimuth memory 315. This 4-bit word corresponds to the four least significant bits of the 10-bit azimuth address.

If the status is changed from 000 to 111, the ALU clears and its output (zero) is connected to azimuth memory 315. Thus, the value stored in the azimuth memory 315 is initially zero. Since status memory 304 and azimuth memory 315 are incremently addressed simultaneously by the range clock on lines 313a and 313b, the 4-bit azimuth word and the 3-bit status word are located in corresponding cells which are accessed at the same time.

While status remains at 111, the fade-out angle subtractor 312 provides an input of zero to A of ALU 308. The ALU 308 is set to add (A+B), the B being provided by azimuth memory 315. Control logic unit 303 provides the carry 1 associated with input A each time the LSB of the current azimuth changes from 0 to 1; this counts half of the "target on" azimuth sweeps.

When the fade-out sequence starts, by status changing from 111 to 110, the output of azimuth memory 315 is transferred unchanged back to azimuth memory 315 (A and its carry are zero). Thus, half-width target information is retained.

If the target does not reappear, the status will eventually change from 010 to 000; this indicates write-plot. If the target reappears the status will return to 111, and the target centering calculations will be aborted.

Write-plot is initiated by control logic unit 303 and causes a fixed fade-out angle to be subtracted from the current azimuth on lines 314a and 314b (4-bits, LSB). This fixed angle is preselected to match the beam width of the radar system, and in the present embodiment is 1.4 degrees, which is approximately equivalent to the angle subtracted by four range sweeps. The output of the fade-out angle subtractor 311 goes to input A of ALU 308; ALU 308 is set to the (A-B) mode, and the half-angle of "target on" stored in azimuth memory 315 is subtracted. If a borrow signal is generated in this process, it is necessary to subtract one from the most significant bits of current azimuth. Zero/minus-one logic 309 is provided for this purpose. Thus, target azimuth center is calculated.

When video processor 300 has determined that a digitized radar target is valid for plotting, the write-plot command is generated and the range (9-bits) and center azimuth (10-bits) are entered into new data stack 211 of FIG. 7B.

Referring to FIGS. 7A and 7B, data is stacked in sequential addresses by stepping an address counter new data stack address 220 after each write-plot command. Sixteen addresses are available. The purpose of new data stack 211 is to temporarily store new plot data so that it may be inserted in plot data memory 200 in the correct position, one data word at a time. During the read-out mode, when plots are transferred to plot data memory 200, the new data stack memory address is decremented by one until the address is zero; this zero is detected by zero detector 222.

New data input gates 208 provide a means for setting the input data lines to zero for new data memory stack 211. This is done automatically by sequential logic controller 350, through line 426.

Clock generator 240 is precisely controlled by a 10 MHz crystal oscillator. Clocking impulses are counted from the time that plotting is initiated (plotting start). The output from the counter is decoded to control a lapse time indicator 241 which is a conventional four-digit LED indicator showing lapsed time in minutes and hundredths of minutes.

Also in clock generator 240, the clocking impulses are counted down to provide plotting initiation signals at intervals of 0.25, 0.5, 1.0 and 3 minutes. The plotting interval is selectable by plot interval control 242. Plot scan generator 244 generates a scan signal commencing at the onset of the first heading-flash from the radar antenna drive received on line 243 after the plotting initiation signal. This scan signal continues until the onset of the next heading-flash, and then remains off until another heading-flash following a new plotting initiation signal. The clock generator 240 is enabled, together with new data input gates 208, through line 428 from sequential logic controller 350.

Scan signals generated in plot scan generator 244 are counted by plot scan counter 245 which is a 7-bit counter. As will be described later, the scan numbers are stored with the plot data to identify the age of the data for orderly erasure of the oldest plot. Scan signals generated in plot scan generator 244 also control plot scan gate 205. This gate allows write plot signals to advance the address in new data stack address 220 for each of the sets of plot data during a scan period. The gate follows the address incrementing signal with a load data signal which causes a set plot data to be loaded in new data stack 211.

When data is being transferred from new data stack 211 to plot data memory 200, through memory input select 198, the new data stack address is decremented under control of sequential logic controller 350. Lapse time indicator 241 and the plotting interval counters in clock generator 240 are all reset when plotting is terminated; the reset signal is on line 430 from sequential logic controller 350.

Comparator 250 allows, through compare select switch 215, output data from plot data memory 200 to be compared with either present range and azimuth of the radar system on lines 216B and 216A, or data output from new data stack 211. Comparator 250 recognizes two conditions: (1) memory range and azimuth equals current range and azimuth; and (2) memory range and azimuth are greater than current range and azimuth. These outputs go to sequential logic controller 350 to generate write plot signals, this will be described later.

Data is routed through a loop, under control of sequential logic controller 350, consisting of memory input select switch 198, buffer B 204, buffer A 202 and plot data memory 200. Memory input select switch 198 either allows new data to be inserted from new data stack 211 or allows old data to continue through the loop. Buffer A 202 may be cleared, or loaded from buffer B 204 under control of sequential logic controller 350. Buffer B 204 may be loaded from the output of memory input select switch 198 under the control of sequential logic controller 350. Nine bits of range data, ten bits of azimuth data and one bit of plot valid data are transferred from the new data stack 211, through memory input select switch 198, through buffer B 204, through buffer A 202 to the plot data memory 200. Target information gate 262 adds a second bit to the plot valid information when the scan number associated with the target is greater than zero; these two bits are referred to later as plot information bits. At the same time as data is transferred from the new data stack 211, 7-bit data, representing the scan number, is transferred from plot scan counter 245. The 7-bit scan number circulates the same loop as the azimuth and range data, however, between buffer B 204 and buffer A 202 is an arithmetic unit Trans/Minus 1 212 which either transfers the 7-bit number unchanged or subtracts one before transferring it. Trans/Minus 1 212 is enabled under command from sequential logic controller 350, through line 450.

Plot data memory 200 has 256 addresses which may be sequantially addressed by plot memory address counter 266 under control of the sequential logic controller 350. Plot memory address counter 266 may be reset to zero, incremented by one or decremented by one. When the memory address is zero the condition is detected by address zero detect 271, and when the scan number associated with a target is zero it is detected by scan zero detect 264. Presence of scan number 3 is detected by scan 3 detect 272; this is used during plot erasure to delete all plots except those associated with scan numbers 0, 1 and 2. Scan 3 detect 272 is cleared each time plot memory address counter goes through zero. Thus, after all plot data memory 200 addresses have been accessed scan 3 detect 272 senses the presence or lack of scan number 3 in plot data memory 200. Detections of zero and scan 3 provide inputs to the sequential logic controller 350.

The word configuration of data stored in plot data memory 200 is:

| Bit # | | | | | |
|---|---|---|---|---|---|
| 0 | AZIMUTH | DATA | BIT | # | 0 |
| 1 | " | " | " | # | 1 |
| 2 | " | " | " | # | 2 |
| 3 | " | " | " | # | 3 |
| 4 | " | " | " | # | 4 |
| 5 | " | " | " | # | 5 |
| 6 | " | " | " | # | 6 |

-continued

| Bit # | | | | | |
|---|---|---|---|---|---|
| 7 | " | " | " | # | 7 |
| 8 | " | " | " | # | 8 |
| 9 | AZIMUTH | DATA | BIT | # | 9 |
| 10 | RANGE | DATA | BIT | # | 0 |
| 11 | " | " | " | # | 1 |
| 12 | " | " | " | # | 2 |
| 13 | " | " | " | # | 3 |
| 14 | " | " | " | # | 4 |
| 15 | " | " | " | # | 5 |
| 16 | " | " | " | # | 6 |
| 17 | " | " | " | # | 7 |
| 18 | RANGE | DATA | BIT | # | 8 |
| 19 | PLOT | INFORMATION | BIT | # | 0 |
| 20 | PLOT | INFORMATION | BIT | # | 1 |
| 21 | PLOT | SCAN NUMBER | BIT | # | 0 |
| 22 | " | " | " | # | 1 |
| 23 | " | " | " | # | 2 |
| 24 | " | " | " | # | 3 |
| 25 | " | " | " | # | 4 |
| 26 | " | " | " | # | 5 |
| 27 | PLOT | SCAN NUMBER | BIT | # | 6 |

Plot information is contained in bits 19 and 20:

| BIT 19 | BIT 20 | Target Information |
|---|---|---|
| 0 | 0 | Not valid target |
| 0 | 1 | Valid - first plot |
| 1 | 0 | Spare |
| 1 | 1 | Valid - Not first plot |

The modes of operation under control of sequential logic controller 350 will now be described in order to clarify the functions of the plot data memory 200 and its supporting components comprising memory input select switch 198, buffer B 204, buffer A 202, target info 262, scan zero detect 264, address zero detect 271, Trans/Minus 1 212, compare select 215, and comparator 250.

First, consider the writing-plot-data mode in which new data is transferred from new data stack 211 to plot data memory 200; the new data is precisely interleaved with old data from previous scans in strict order of magnitude. Compare data select switch 215 connects comparator 250 to compare new data at the output of the new data stack 211 with data presently accessed from plot data memory 200. Data is sequentially accessed from plot data memory 200 by sequential logic controller 350 until the data (plot data) from plot data memory 200 numerically exceeds the new data, as determined by comparator 250. The new data is then shifted into buffer B 204; this is followed by again shifting the new data from buffer 204 into buffer A 202 and the old plot data into buffer B 204 through memory input select switch 198. To accommodate the new data in the plot data memory 200, all old plot data following the new data must be replaced in plot data memory 200 in a new address one higher than previously used. This is accomplished by plot memory address counter 266 being incremented under control of sequential logic controller 350. It will be realized that the new data is replaced in plot data memory 200 at the address which originally held the old plot data which was found to numerically exceed the new data. After the new data in buffer A 202 is moved into plot data memory 200, the plot data in buffer B 204 is moved into buffer A 202 and its next plot data from plot data memory 200 is moved into buffer B 204 and so on has been reolocated in plot data memory 200. Data in new data stack 211 is sequentially accessed from the highest address of new plot data downward, by decrementing new data stack address 220 by command from sequential logic controller 350 after new data has been loaded into buffer B 204. Each time new data stack 211 has access to the next data, the cycle of insertion of the next new data into plot data memory 200 recommences. When all new data has been transferred, sequential logic controller 350 detects zero address by zero detect 222 and stops this mode of operation. All new data transfers are made during the end-of-range sweep downtime immediately following a plotting scan.

Second, consider the start-up condition when all data in all plot memory 200 addresses must be cleared. Buffer A 202 is cleared and plot memory address counter 266 is initially set to zero. The no data contents of buffer A 202 are transferred to plot data memory 200 and plot memory address counter 266 is incremented by one. These functions are commanded by sequential logic controller 350 and repeated until plot memory address counter 266 returns to zero. Plot data memory 200 is now ready for the routine of storing new plot data.

Third, consider the mode for erasing plot data from the plot data memory 200. This mode is initiated by the operator through Erase-3 control, which enables sequential logic controller 350 to control the erase procedure. Plot data memory 200 is sequentially addressed by incrementing plot data address counter 266 under control of sequential logic controller 350. Scan zero detect 264 tests each scan number associated with plot data as it is accessed from plot data memory 200. If a zero is detected, buffer A 202 is cleared and its zero data are loaded into plot data memory 200. When a scan number exceeds zero, it is reduced by one, by Trans/Minus 1 212, by reinsertion of the modified data into the same memory address. Thus, in cycling through all addresses of plot data memory 200, all data associated with scan number zero are erased and all other scan numbers are reduced by one; in particular, a later set of data obtained during a single radar scan is now associated with scan number zero. If the cycle is repeated the data now associated with scan number zero will also be erased and all scan numbers again will be reduced by one. The erasure cycles will continue until scan number 3 is not detected in any address. Absence of scan number 3 is detected by scan 3 detect 272 which includes a flip-flop which is reset by plot memory address counter 266 each time it goes to zero. A decoder in scan 3 detect 272 sets the flip-flop when scan number 3 is present at the output of plot data memory 200. When all data associated with scan number 3 has been deleted, only the latest three sets of plot data remain in the plot data memory 200. When all the deletions have been made, sequential logic controller 350 provides a repacking routine which removes gaps between data words in the memory. This is accomplished by repeatedly reloading data found in addresses above the gap into lower addresses until the gap is eliminated.

Fourth, consider the data overflow condition when the loading of plot data memory 200 is approaching its maximum capacity, and room must be made for new data. Overflow 274 detects that plot data memory 200 contains valid plot (bit 19) at addresses exceeding 239. This detection is done during the plot writing mode. Detection of overflow through the action of sequential logic controller 350 causes all data associated with scan number zero to be deleted, plot data memory 200 to be repacked and all stored scan numbers to be reduced by one, as described for the erasure mode. However, the initiation of overflow causes only data associated with the earliest scan to be removed.

Fifth, consider the routine for reading plots out of plot data memory 200 at the appropriate azimuth and range positions to generate plot video signals. This procedure also includes checking that plots are within prescribed boundaries of the sector in which plots are required. Furthermore, during this routine checks are made for new plot data being available for loading into plot data memory 200 of FIG. 7B.

Plot memory address counter 266 is incremented under control of sequential logic controller 350 after each plot video signal has been generated. By this means, plot data memory 200 is sequentially addressed and presents the next plot data to comparator 250 which through compare select 215 compares the next plot data with current azimuth and current range. When next plot data and current data are equal, a signal goes from comparator 250 to sequential logic controller 350 which generates a plot video signal. This signal goes to video mixer 231 for mixing with other video signals. Following the generation of a plot video signal, sequential logic controller 350 determines if the azimuth and range are within the plotting sector; that is, if the sector gate generator 280 of FIG. 7A is generating a sector gate signal. If the plot is out of sector, sequential logic controller 350 causes the plot data which is transferred from plot data memory 200 to buffer B 204 and then to buffer A 202 to be cleared in buffer A 202 of FIG. 7B. During the radar down time after the end of the range sweep, the data in plot data memory 200 will be repacked to eliminate spaces due to deleted data. The method of repacking is the same as that previously described for the erasure modes.

If the plots in a range sweep period all occurred in the plotting sector and the plot scan rate 205 is not enabled, and new data is available in new data stack 211, sequential logic controller 350 will cause the new data to be transferred to plot data memory 200. This transfer procedure has been described. Detection of new data in the new data stack 211 is by a non-zero address being detected by zero detector 222 which provides an input to sequential logic controller 350.

Figure 11B:
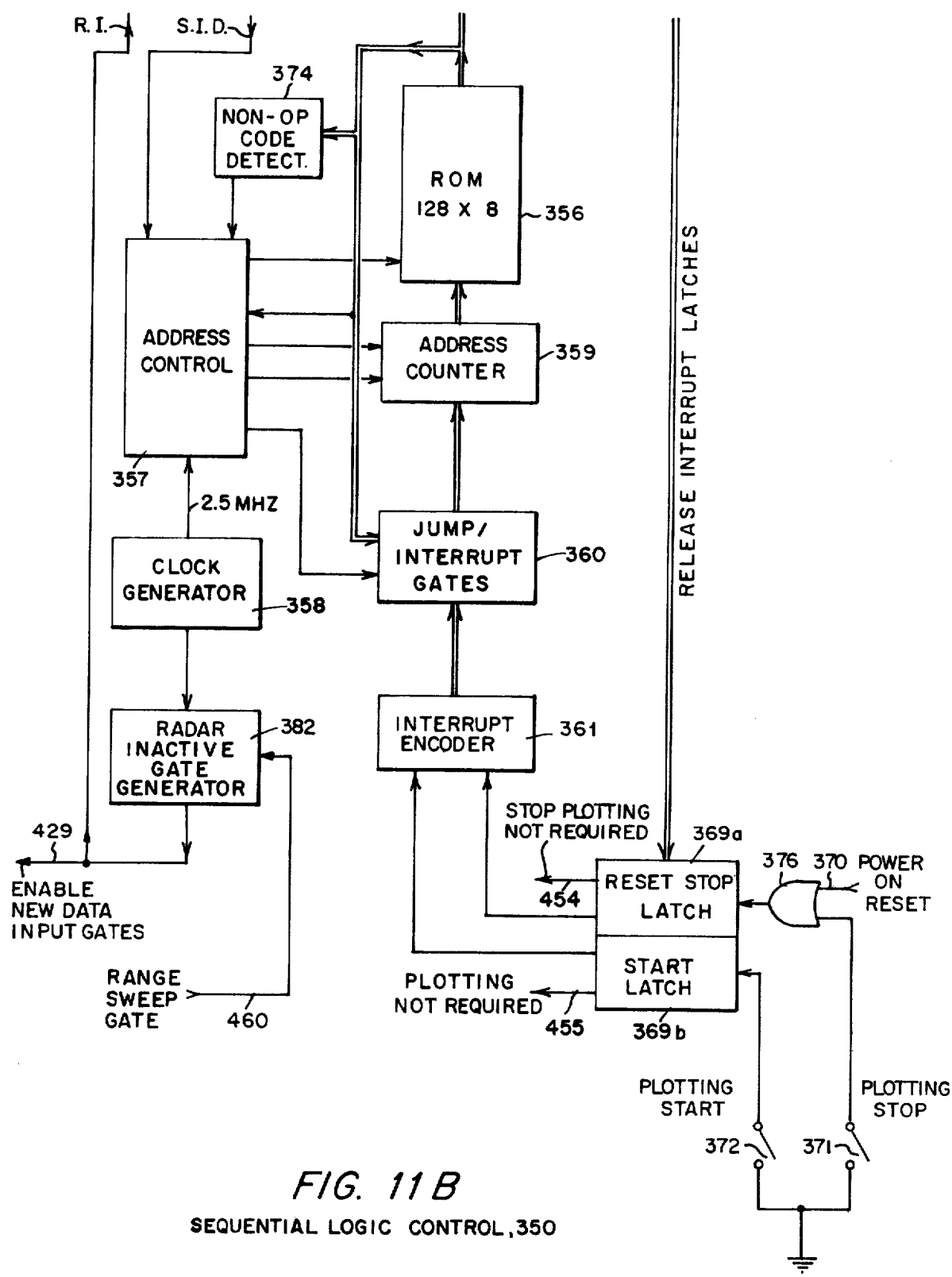

Sequential logic controller 350 will now be described with the aid of FIGS. 11A and 11B. Sequential logic controller 350 comprises a real time video plot generator, means for sensing conditions in the automatic plotter circuits and a memory to provide the required function controls.

Each time comparator 250 detects plot data equals current data, a signal is generated and sent to the plot video generator 351 on line 401. During the active period of the range sweep a gating signal is generated by range clock 260. This signal is conveyed to plot video generator 351 by line 460. The signals on lines 401 and 460 are combined in plot video generator 351 to generate a write plot output on line 420 each time the current data equals the plot data during the active plotting range of the automatic plotter.

When the plot data is associated with scan number 0, as detected by scan zero detect 264 and its signal conveyed by line 402, the write plot output pulse on line 420 is made to have approximately 3 microseconds duration by plot video generator 351. This duration of pulse causes a long radial line to be written on PPI display and is used to identify the beginning of a trail of plots. For plot data associated with any other scan number, the write plot output pulse is approximately 0.4 microseconds duration, and causes a small substantially circular plot to be written on PPI display 172.

As a precaution against spurious generation of plot signals, plot video generator 351 may be enabled or inhibited through line 453 under control of the routines to be discussed later. This is achieved through flip-flop (4) 373 set and reset by plot start and plot stop signals from the logic control through output selector 355.

To allow the logic system to operate asynchronously with the real time radar data, the conditions for a plot cause plot latch 379 to set; the latch is reset through line 366 immediately after the logic circuits have sampled this state. In a similar manner the conditions for a plot out-of-sector cause plot out-of-sector latch 378 to be set. This latch is also reset by the signal on line 366.

Routines for controlling automatic plotter functions are determined by a series of instructions stored in read only memory 356. A maximum of 128 eight-bit words are stored. Read only memory 356 is conventional and is readily available; a typical memory is made by Monolithic Memories as Type 6335-1. Operator commands or conditions sensed in the circuits of the automatic plotter cause a sub-routine to be started by accessing a specific memory address. Usually, sub-routines are sequentially run. However, a start or stop command from the operator takes priority and interrupts a functioning routine by forcing access to a specific memory address.

There are four classes of words stored as instructions. The first class allows selected circuits of the automatic plotter to have their STATES interrogated. The words are identified by bits 7,6 and 5 having 0, 1 and 0 values, respectively:

| Bit No. | 7 | 6 | 5 | 4 | 3 | 2 | 1 | 0 |
|---------|---|---|---|---|---|---|---|---|
| Code    | 0 | 1 | 0 | X | X | X | X | X |

└── Input Selection Code ──┘

The code of bits 7, 6 and 5 is recognized by a decoder in input gates 352 which enables the gates to pass the remaining five bits to input selector 354. The five bits allow one out of 32 possible inputs to be selected; in the present embodiment only fifteen of the possible 32 input circuits are used. If the selected input is low, address control 357 automatically increments address counter 359 and enables read only memory 356, causing the next address in read only memory 356 to be accessed. If the selected input is high, address control 357 automatically increments address counter 359 without enabling the memory. After a delay of about 400 nanoseconds, address control 357 again increments address counter 359; this time read only memory 356 is enabled and an address two greater than previously accessed is accessed. To more efficiently use words in read only memory 356, some states have both inverted and non-inverted inputs. For example, Erase-3 is sensed as logic high for Erase-3 requested, and for Erase-3 not requested. Similarly, logic high sensing is provided for radar active and radar inactive; inverter 391 provides the inversion as seen in FIG. 11A.

The second class of words calls for a specific address to be accessed in read only memory 356; this is a JUMP command and is identified by bit 7 being 1:

| Bit No. | 7 | 6 | 5 | 4 | 3 | 2 | 1 | 0 |
|---|---|---|---|---|---|---|---|---|
| Code | 1 | X | X | X | X | X | X | X |

ROM Address Code (bits 6–0)

Through address control 357, bit number 7 inhibits automatic incrementing of address counter 359, switches JUMP/interrupt gates 360 to direct the 7-bit ROM address code to the data input of address counter 359 and causes address counter 359 to be set to the ROM address code output from JUMP/interrupt gates 360. Thus, each time STATE is requested the routine presents the opportunity to branch by means of a JUMP instruction to a new address or routine. The new branch is only used if the input data selected by input selector 354 is low. If the input data is high the routine proceeds by automatically sequentially addressing read only memory 354.

The third class of words is used to control specific circuits in the automatic plotter and provides the EXECUTE function of the sub-routine. An EXECUTE word is identified by bits 7, 6 and 5 being 0, 0 and 1, respectively:

| Bit No. | 7 | 6 | 5 | 4 | 3 | 2 | 1 | 0 |
|---|---|---|---|---|---|---|---|---|
| Code | 0 | 0 | 1 | X | X | X | X | X |

Output Selection Code (bits 4–0)

The code of bits 7, 6 and 5 is recognized by a decoder in output gates 353, which enables the gates to pass the remaining five bits to output selector 355. The five bits allow selection of one out of 32 possible output commands; in the present embodiment only 22 alternative outputs are used. Eleven of these outputs (426, 430 and 432 through 440) provide transitory commands to the automatic plotter circuits of FIGS. 7A and 7B.

Seven outputs provide set and reset control of flip-flop (1) 362, flip-flop (2) 363, flip-flop (4) 373 and flip-flop (5) 375, which provide non-transitory commands through 450, 451 and 428 to the automatic plotter circuits of FIGS. 7A and 7B and to plot video generator 351. Load buffer B command resets flip-flop (1). The non-transitory output of flip-flop (4) 373, provides gating of plot video generator 351 output to permit write plot output signals only during the active range period.

Four outputs provide releases through line 366 for plot latch 379 together with plot out-of-sector latch 378, reset/stop latch 369a and start latch 369b and through line 367 Erase-3 latch referred to as flip-flop (3) 365.

The output of flip-flop (3) 365 of FIG. 11A provides Erase-3 request input to the logic circuits through input selector 345. The Erase-3 request is not released until Erase-3 routine has been completed.

The fourth class of words has but a single word, and is used to suspend operation of the sequential logic controller. In this condition the sequential logic controller is available to accept the next interrupt command. The word, referred to as NON-OP, has all eight bits set to zero as in FIG. 11B. When NON-OP code detector 374 detects a NON-OP word, it causes address control 357 to cease incrementing addresss counter 359, and clock data from JUMP/interrupt gates 360 which are directed to pass addresses from interrupt encoder 361.

The sub-routine sequences, showing the use of various instruction words accessed from reach only memory 356 will be described later by way of a sample listing.

Address control 357 has four inputs: (a) NON-OP code present, (b) selected input data high/low, (c) JUMP address present through bit-7, (c) 2.5 megahertz clock from clock generator 358. From these inputs, address control 357 generates incrementing pulses for address counter 359 and clocking pulses to load data from JUMP/interrupt gates 360 into address counter 359. Address control 357 also generates correctly timed enable signals to activate the addressing of read only memory 356 from address counter 359. Furthermore, address control 357 controls the selection of a jump address or an interrupt address through JUMP/interrupt gates 360.

Clock generator 358 consists of a 10 MHz crystal oscillator and a four-to-one divider to provide incrementing signals for address control 357. Clock generator 358 also provides 1 MHz clocking signals for inactive gate 382.

Radar inactive gate generator 382 receives the range sweep gate signal of line 460, at the end of the range sweep this signal starts a 7-bit counter clocked by a 1 MHz signal from clock generator 358. After a counter of 128, the clock signal is inhibited and counting cannot restart until the end of the next range sweep signal. While the counting is not inhibited, a radar inactive gate signal is generated. This radar inactive gate signal starts at the end of the range sweep, which in the present implementation covers 25.6 nautical miles, and occurs 316.4 microseconds after the trigger signal (line 259 of FIG. 7A). The radar inactive gate persists for 128 microseconds, that is until 444.4 microseconds after the said trigger pulse. When a radar pulse repetition frequency of 2,000 Hz is used, there will be a further time interval of 55.6 microseconds to the next trigger pulse. Certain routines cannot be run during the active radar time. Accordingly, the purpose of the radar inactive gate is to enable these routines only during the radar down time period, and only when sufficient time remains for the subroutine to be completed. The radar inactive gate provides the warning through input selector 354 that the down time may be insufficient to allow the whole routine to be completed and escape is necessary.

Interrupts initiate a routine by directing read only memory 356 to access a specific address. These interrupts have priority over running routines. Since the initiating means of an interrupt may be transitional, interrupt latches 369a and 369b are used. When the routine associated with the interrupt is completed, the latch is released.

Power on reset signal is received from the power supply unit on line 370; the signal is a pulse of approximately one microsecond duration. This pulse is generated in the power supply unit about five seconds after all dc voltages have reached correct voltage levels. Plotting stop is obtained by manually actuating a momentary switch 371. Plotting stop and power on reset signals are ORed in OR gate 376 to provide a single input to set reset/stop latch 369a.

Plotting start is obtained by manually actuating momentary switch 372.

The outputs of reset/stop latch 369a and start latch 369b are available to be sampled by input selector 354 in lines 454 and 455 to allow interruption of a routine at an appropriate point. The outputs of the latches cause the selection of one of two 7-bit codes in interrupt encoder 361. As previously mentioned, the routines are entirely determined by the order and contents of words permanently stored in read only memory 356. The purpose, conditions for initiating and the logic steps of each routine will now be described by using one example of the embodiment. The instruction words given in Table I will be used in this description; however, the instruction words will be identified in the abbreviated form of IW followed by the instruction word number, for example, start plotting is IW34.

TABLE I

INSTRUCTION WORDS

| Code | Instruction Word Code Number | Function |
|---|---|---|
| 00000000 | IW 0 | NON-OP code |
| 00100000 | IW32 | Not used |
| 00100001 | IW33 | Stop plotting |
| 00100010 | IW34 | Start plotting |
| 00100011 | IW35 | Inhibit clock generator |
| 00100100 | IW36 | Enable clock generator |
| 00100101 | IW37 | Reset counters |
| 00100110 | IW38 | Clear plot data memory address |
| 00100111 | IW39 | Increment plot data memory address |
| 00101000 | IW40 | Decrement plot data memory address |
| 00101001 | IW41 | Clear buffer A |
| 00101010 | IW42 | Load buffer A |
| 00101011 | IW43 | Clear new data word |
| 00101100 | IW44 | Spare |
| 00101101 | IW45 | Load buffer B |
| 00101110 | IW46 | Load plot data memory |
| 00101111 | IW47 | Spare |
| 00110000 | IW48 | Decrement new data stack address |
| 00110001 | IW49 | Load new data stack |
| 00110010 | IW50 | Spare |
| 00110011 | IW51 | Transfer scan number minus one |
| 00110100 | IW52 | Select current data for comparison |
| 00110101 | IW53 | Select new data for comparison |
| 00110110 | IW54 | Clear plot latches |
| 00110111 | IW55 | Clear Erase-3 latch |
| 00111000 | IW56 | Spare |
| 00111001 | IW57 | Release interrupt latch - plot stop |
| 00111010 | IW58 | Release interrupt latch - plot start |
| 00111011 | IW59 | 59 through 63 are spare |
| 00111111 | IW63 | |
| 01000000 | IW64 | Not used |
| 01000001 | IW65 | Plot data memory address ≠ 0 |
| 01000010 | IW66 | New data stack address ≠ 0 |
| 01000011 | IW67 | Plot memory data / new data |
| 01000100 | IW68 | Plot bit present |
| 01000101 | IW69 | Scan number 3 not present |
| 01000110 | IW70 | Plot not out of sector |
| 01000111 | IW71 | Plotting not requested |
| 01001000 | IW72 | Plot made |
| 01001001 | IW73 | Radar active |
| 01001010 | IW74 | No overflow |
| 01001011 | IW75 | Erase-3 requested |
| 01001100 | IW76 | Scan number ≠ 0 |
| 01001101 | IW77 | Stop plotting not requested |
| 01001110 | IW78 | Radar inactive |
| 01001111 | IW79 | Erase-3 not requested |
| 01010000 | IW80 | 80 through 127 are spare |
| 01111111 | IW127 | |

TABLE I-continued

INSTRUCTION WORDS

| Code | Instruction Word Code Number | Function |
|---|---|---|
| 1XXXXXXX | IW128 | 128 JUMP addresses at 128 through 255 |
| 1XXXXXXX | IW255 | |

RESET AND PLOTTING STOP ROUTINES

Purpose:
  To stop plotting and reset circuits to an initial condition.
Conditions for initiating:
  (a) Power-on reset signal on line 370
  (b) Plotting stop switch 371
First address of routine comes from interrupt encoder 361 and is 1.

| Step | Instruction | Address | Instruction Code |
|---|---|---|---|
| 1 | Stop plotting | 1 | IW33 |
| 2 | Inhibit clock generator | 2 | IW35 |
| 3 | Reset counters | 3 | IW37 |
| 4 | Decrement new data stack address | 4 | IW48 |
| 5 | Load new data stack (data inputs are zeros) | 5 | IW49 |
| 6 | Check new data stack address ≠ 0 | 6 | IW66 |
| 7(a) | (if new data stack address = 0) Go to Step 8 | 7 | IW137 |
| 7(b) | (if new data stack address ≠ 0) Go to Step 4 | 8 | IW132 |
| 8 | Clear buffer A | 9 | IW41 |
| 9 | Load plot data memory | 10 | IW46 |
| 10 | Increment plot data address | 11 | IW39 |
| 11 | Check plot data memory address ≠ 0 | 12 | IW65 |
| 12(a) | (if plot data memory address = 0) Go to Step 14 | 13 | IW143 |
| 12(b) | (if plot data memory address ≠ 0) Go to Step 8 | 14 | IW137 |
| 13 | Release plot stop latch | 15 | IW57 |
| 14 | Check plotting not requested | 16 | IW71 |
| 15(a) | (if plotting is requested) Go to plotting start routine Step 2 | 17 | IW149 |
| 15(b) | (if plotting is not requested) NON-OP state | 18 | IW0 |

PLOTTING START ROUTINE

Purpose:
  To clear data from all memory locations and then enable plotting.
Conditions for initiating:
  Plotting start switch 372
First address of routine comes from interrupt encoder 361 and is 20.

| Step | Instruction | Address | Instruction Code |
|---|---|---|---|
| 1 | Go to reset routine Step 1 | 20 | IW129 |

-continued

| Step | Instruction | Address | Instruction Code |
|---|---|---|---|
| 2 | Enable clock generator | 21 | IW36 |
| 3 | Release plot start latch | 22 | IW58 |
| 4 | Clear buffer A | 23 | IW41 |
| 5 | Go to read routine Step 1 | 24 | IW156 |

READ ROUTINE

Purpose:
To read plot data out of memory and generate plot video at appropriate azimuth and range positions. Also checks that plots are within prescribed boundaries and if new plot data are available for loading into memory.
Conditions for initiating:
Automatically follows from other routines
First address of routine is 28.

| Step | Instruction | Address | Instruction Code |
|---|---|---|---|
| 1 | Select current data for comparison | 28 | IW52 |
| 2 | Go to Step 4 | 29 | IW159 |
| 3 | Increment plot data memory address | 30 | IW39 |
| 4 | Check for plot bit | 31 | IW68 |
| 5(a) | (If plot bit is not present) Go to Step 3 | 32 | IW158 |
| 5(b) | (If plot bit is present) Check plot made | 33 | IW72 |
| 6(a) | (if no plot has been made) Go to Step 5(b) | 34 | IW161 |
| 6(b) | (if plot has been made) Check plot is not out of sector | 35 | IW70 |
| 7(a) | (if plot is out of sector) Load plot data memory with zero data from buffer A | 36 | IW46 |
| 7(b) | (if plot is not out of sector) Clear plot latches | 37 | IW56 |
| 8 | Check for radar active | 38 | IW73 |
| 9(a) | (if radar is not active) Go to Step 10 | 39 | IW169 |
| 9(b) | (if radar is active) Go to Step 3 | 40 | IW158 |
| 10 | Check Erase-3 is not requested | 41 | IW79 |
| 11(a) | (if Erase-3 is requested) Go to Erase-3 routine, Step 1 | 42 | IW207 |
| 11(b) | (if Erase-3 is not requested) Check if stop plotting not requested | 43 | IW77 |
| 12(a) | (if stop plotting is requested) Go to reset and stop plotting routines, Step 1 | 44 | IW129 |
| 12(b) | (if stop plotting is not requested) Go to repacking plot data memory routine, Step 1 | 45 | IW174 |

REPACKING PLOT DATA MEMORY ROUTINE

Purpose:
To repack plot data memory 200 after data has been deleted.
Conditions for initiating:
Conditions for initiating:
Automatically follows either Read Routine or Erase-3 and Overflow Routines.

| Step | Instruction | Address | Instruction Code |
|---|---|---|---|
| 1 | Clear plot data memory address | 46 | IW38 |
| 2 | Check for plot bit | 47 | IW68 |
| 3(a) | (if plot bit is not present) Go to Step 5 | 48 | IW179 |
| 3(b) | (if plot bit is present) increment plot data memory address | 49 | IW39 |
| 4 | Go to Step 2 | 50 | IW175 |
| 5 | Increment plot data memory address | 51 | IW39 |
| 6 | Check plot data memory address ≠ 0 | 52 | IW65 |
| 7(a) | (if plot data memory address = 0) Go to Step 22 | 53 | IW201 |
| 7(b) | (if plot data memory address ≠ 0) check for plot bit | 54 | IW68 |
| 8(a) | (if plot bit is not present) Go to Step 5 | 55 | IW179 |
| 8(b) | (if plot bit is present) load buffer B | 56 | IW45 |
| 9 | Clear buffer A | 57 | IW41 |
| 10 | Load plot data memory | 58 | IW46 |
| 11 | Load buffer A | 59 | IW42 |
| 12 | Decrement plot data memory address | 60 | IW40 |
| 13 | Check for plot bit | 61 | IW68 |
| 14(a) | (if plot bit is not present) Go to Step 20 | 62 | IW198 |
| 14(b) | (if plot bit is present) increment plot data memory address | 63 | IW39 |
| 15 | Load plot data memory | 64 | IW46 |
| 16 | Check for radar active | 56 | IW73 |
| 17(a) | (if radar is not active) Go to step 3(b) | 66 | IW177 |
| 17(b) | (if radar is active clear buffer A | 67 | IW41 |
| 18 | Clear plot data | 68 | IW38 |
| 19 | Go to Read Routine | 69 | IW156 |
| 20 | Check plot data memory address ≠ 0 | 70 | IW65 |
| 21(a) | (if plot data memory address = 0) load plot data memory | 71 | IW46 |
| 21(b) | (if plot data memory address ≠ 0) Go to Step 12 | 72 | IW188 |
| 22 | Check if there is no overflow | 73 | IW74 |
| 23(a) | (if there is an overflow) Go to Erase-3 and Overflow Routine, Step 1 | 74 | IW205 |
| 23(b) | (if there is no overflow) Go to Data Transfer Routine, Step 1 | 75 | IW228 |

ERASE-3 and OVERFLOW ROUTINES

Purpose:
To erase data from plot data memory 200 when:
  (a) Erase-3 is requested all data except that received from the latest three plot sets is deleted
  (b) There is the possibility of an overflow of data in plot data memory 200, the oldest set of plots is deleted.
Conditions for initiating:
Automatically follows Repacking Routine if there is an overflow or automatically follows the Read Routine if Erase-3 has been requested.
First address of Routine is 77.

| Step | Instruction | Address | Instruction Code |
|---|---|---|---|
| 1 | Reset | 77 | IW37 |
| 2 | Clear buffer A | 78 | IW41 |
| 3 | Check scan number ≠ 0 | 79 | IW76 |
| 4(a) | (if scan number = 0) Go to Step 9 | 80 | IW214 |
| 4(b) | (if scan number ≠ 0) Load buffer B | 81 | IW45 |
| 5 | Transfer scan number −1 | 82 | IW51 |
| 6 | Load buffer A | 83 | IW42 |
| 7 | Load plot data memory | 84 | IW46 |
| 8 | Go to Step 2 | 85 | IW206 |
| 9 | Load plot data memory | 86 | IW46 |
| 10 | Increment plot data memory address | 87 | IW39 |
| 11 | Check plot data memory address ≠ 0 | 88 | IW65 |
| 12(a) | (if plot data memory address = 0) Go to Step 15 | 89 | IW222 |
| 12(b) | (if plot data memory address ≠ 0) Go to Step 2 | 90 | IW206 |
| 13 | Check for radar inactive | 91 | IW78 |
| 14(a) | (if radar is active) Go to Read Routine, Step 1 | 92 | IW156 |
| 14(b) | (if radar is not active) Check for Erase-3 requested | 93 | IW75 |
| 15(a) | (if Erase-3 is not requested) Go to Repacking Plot Data Memory Routine, Step 1 | 94 | IW174 |
| 15(b) | (if Erase-3 is requested) check for scan number 3 not present | 95 | IW69 |
| 16(a) | (if scan number 3 is present) Go to Step 2 | 96 | IW206 |
| 16(b) | (if scan number 3 is not present) clear Erase-3 latch | 97 | IW55 |
| 17 | Go to Repacking Plot Data Memory Routine, Step 1 | 98 | IW174 |

DATA TRANSFER ROUTINE

Purpose:
To find correct location for new plot data in plot data memory 200, so that data is placed sequentially in increasing magnitude.
Conditions for initiating:
Automatically follows Repacking Plot Data Memory Routine.
First address of Routine is 100.

| Step | Instruction | Address | Instruction Code |
|---|---|---|---|
| 1 | Clear plot data memory address | 100 | IW38 |
| 2 | Select new data for comparison | 101 | IW53 |
| 3 | Check plot memory data not greater than new data | 102 | IW67 |
| 4(a) | (if plot memory data is greater) Go to Step 7 | 103 | IW236 |
| 4(b) | (if plot memory data is not greater) check for plot bit | 104 | IW68 |
| 5(a) | (if plot bit is not present) Go to Step 7 | 105 | IW236 |
| 5(b) | (if plot bit is present) increment plot data memory address | 106 | IW39 |
| 6 | Go to Step 3 | 107 | IW231 |
| 7 | Load buffer B | 108 | IW45 |
| 8 | Load buffer A | 109 | IW42 |
| 9 | Select current data for comparison | 110 | IW52 |
| 10 | Load buffer B | 111 | IW45 |
| 11 | Load plot data memory | 112 | IW46 |
| 12 | Load buffer A | 113 | IW42 |
| 13 | Increment plot data memory address | 114 | IW39 |
| 14 | Check for plot data memory address ≠ 0 | 115 | IW65 |
| 15 | (if plot data memory address = 0) Go to Step 20 | 116 | IW249 |
| 16 | (if plot data memory address ≠ 0) load buffer B | 117 | IW45 |
| 17 | Load plot data memory | 118 | IW76 |
| 18 | Load buffer A | 119 | IW42 |
| 19 | Go to Step 13 | 120 | IW242 |
| 20 | Check new data stack address ≠ 0 | 121 | IW66 |
| 21 | (if new data stack address = 0) Go to Read Routine, Step 1 | 122 | IW156 |
| 22 | (if new data stack address ≠ 0) clear new data word | 123 | IW43 |
| 23 | Check if radar inactive | 124 | IW78 |
| 24 | (if radar active) Go to Read Routine, Step 1 | 125 | IW156 |
| 25 | (if radar inactive) decrement new data stack address | 126 | IW48 |
| 26 | Go to Step 1 | 127 | IW228 |

While the above routines have been accomplished by the described hardware, it should be understood that the embodiment can be of a different form and can be made to perform the same plotting purposes. Furthermore, this purpose can be accomplished using a microprocessor having specially written software routines. Such alternatives are considered to be other embodiments of the present invention which for example, accepts sets of plot information, one scan at a time, from the radar in real time at arbitrary time intervals of say, one, two or five minutes, and reassemblies the data for continuously writing the plots together with the radar signals in real time.

It is understood that the above-described embodiments of the invention are illustrative only and that modifications thereof may occur to those skilled in the art. Accordingly, it is desired that this invention is not to be limited to the embodiments disclosed herein, but is to be limited only as defined by the appended claims.

What is claimed is:

1. A plotting system for use with a radar having a PPI display producing target pulses at a plurality of ranges and azimuths, said target plotting system comprising:
means for digitally storing in a first memory range and azimuth coordinate target data within a selected zone to provide plot data;
means for interleaving said stored range and azimuth plot data from said first memory into a second memory to provide a range and azimuth sequence corresponding to that of a real time sequence of range sweep and azimuth scans of a PPI; and
means for comparing digitally said stored range and azimuth plot data with current range and azimuth data in which equality of digital values in range and azimuth effect the generation of a plot video signal adapted to be displayed within a selected zone of said target plotting system.

2. A plotting system for use with a radar display producing target pulses at a plurality of ranges and azimuths, said target plotting system comprising:
- means for digitally storing in a first memory range and azimuth coordinate target data within a selected zone to provide plot data;
- means for shuffling said stored range and azimuth plot data from said first memory into a second memory to provide a range and azimuth sequence corresponding to that of a real time sequence of range sweep and azimuth scans of said display;
- means for comparing digitally said stored range and azimuth plot data with current range and azimuth data in which equality of digital values in range and azimuth provide a plot video pulse adapted to be displayed within a selected zone of said target plotting system;
- means for progressively assigning to each plotting scan a scan number in sequential order;
- means for storing said assigned number together with the plot data in the second memory; and
- means acting in response to said number for dropping the earliest of said plot data to make room for new plot data.

3. A plotting system for use with a PPI radar producing target pulses at a plurality of ranges and azimuths said target plotting system comprising:
- means for digitally storing in a first memory range and azimuth coordinate target data within a selected zone to provide plot data;
- means for shuffling said stored range and azimuth plot data from said first memory into a second memory to provide a range and azimuth sequence corresponding to that of a real time sequence of range sweep and azimuth scans of a PPI;
- means for comparing digitally said stored range and azimuth plot data with current range and azimuth data in which equality of digital values in range and azimuth provide a plot video pulse adapted to be displayed within a selected zone of said target plotting system; and
- means for reducing the number of plots being displayed on said PPI radar to a predetermined number, said latter means including means for deleting from said selected zone the earliest scan plots appearing on said PPI.

4. A plotting system for use with a PPI radar producing target pulses at a plurality of ranges and azimuths, said target plotting system comprising:
- means for digitally storing in a first memory range and azimuth coordinate target data within a selected zone to provide plot data;
- means for shuffling said stored range and azimuth plot data from said first memory into a second memory to provide a range and azimuth sequence corresponding to that of a real time sequence of range sweep and azimuth scans of a PPI;
- means for comparing digitally said stored range and azimuth plot data with current range and azimuth data in which equality of digital values in range and azimuth provide a plot video pulse adapted to be displayed within a selected zone of said target plotting system; and
- means for modifying said plot video pulse to identify the earliest scan plots displayed.

5. A plotting system for use with a PPI radar producing target pulses at a plurality of ranges and azimuths, said target plotting system comprising:
- means for digitally storing in a first memory range and azimuth coordinate target data within a selected zone to provide plot data;
- means for shuffling said stored range and azimuth plot data from said first memory into a second memory to provide a range and azimuth sequence corresponding to that of a real time sequence of range sweep and azimuth scans of a PPI;
- means for comparing digitally said stored range and azimuth plot data with current range and azimuth data in which equality of digital values in range and azimuth provide a plot video pulse adapted to be displayed within a selected zone of said target plotting system; and
- means to identify the most recent scan plots displayed.

6. A radar plotting system for use with a PPI radar producing target pulses at a plurality of ranges and azimuths, said target plotting system comprising:
- means for digitally storing in a first memory range and azimuth coordinate target data within a selected zone to provide plot data;
- means for shuffling said stored range and azimuth plot data from said first memory into a second memory to provide a range and azimuth sequence corresponding to that of a real time sequence of range sweep and azimuth scans of a PPI;
- means for comparing digitally said stored range and azimuth plot data with current range and azimuth data in which equality of digital values in ranges and azimuth provide a plot video pulse adapted to be displayed within a selected zone of said target plotting system; and
- means in which the lapsed time between earliest and latest plot is displayed.

7. A radar plotting system for use with a PPI radar producing target pulses at a plurality of ranges and azimuths, said target plotting system comprising:
- means for establishing a single set of range and azimuth coordinates from a target which generates multiple azimuth values due to beam width of the antenna of said radar system;
- means for digitally storing in a first memory range and azimuth coordinate plot data within a selected zone to provide plot data;
- means for shuffling said stored range and azimuth plot data from said first memory into a second memory to provide a range and azimuth sequence corresponding to that of a real time sequence of range sweep and azimuth scans of a PPI;
- means for comparing digitally said stored range and azimuth plot data with current range and azimuth data in which equality of digital values in range and azimuth provide a plot video pulse adapted to be displayed within a selected zone of said target plotting system.

8. A radar target plotting system for use with a PPI radar producing target pulses at a plurality of ranges and azimuths, said target plotting system comprising:
- means for digitally storing in a first memory range and azimuth plot data within a selected zone to provide plot data;
- means for interspersing stored range and azimuth coordinate plot data from said first memory into a second memory to provide a range and azimuth sequence corresponding to that of a real time sequence of range sweep and azimuth scans of a PPI;

means for comparing digitally said interspersed range and azimuth plot data with current range and azimuth data in which equality of digital values in range and azimuth provide a plot video pulse adapted to be displayed within the selected zone of said target plotting system; and means for adjusting the boundaries of said selected zone to limit the plotting area on the PPI.

9. A radar plotting system for use with a PPI radar producing target pulses at a plurality of ranges and azimuths, said target plotting system comprising:

means for digitally storing in a first memory range and azimuth coordinate plot data within a selected zone to provide plot data;

means for shuffling said stored range and azimuth plot data from said first memory into a second memory to provide a range and azimuth sequence corresponding to that of a real time sequence of range sweep and azimuth scans of a PPI;

means for comparing digitally said stored range and azimuth plot data with current range and azimuth data in which equality of respective digital values in range and azimuth provide a plot video pulse adapted to be displayed within a selected zone of said target plotting system;

means for establishing a single set of range and azimuth coordinates from a target which generates multiple azimuth values due to beam width of the antenna of said radar system;

means for determining the center value of said multiple azimuth values; and means for using said enter value as the azimuth coordinate for said stored azimuth plot data.

10. A radar plotting system comprising:

means for digitally storing in a first memory range and azimuth target data to provide plot data;

means for interleaving said stored range and azimuth plot data from said first memory into a second memory to provide a range and azimuth sequence corresponding to that of a real time sequence of range sweep and azimuth scans of a radar indicator; and means for comparing digitally said stored range and azimuth plot data with current range and azimuth data in which equality of digital values in range and azimuth provide plot data adapted to be displayed on said radar indicator.

11. A radar plotting system in accordance with claim 10 wherein means are provided for reducing the number of sets of plot data being displayed on said radar indicator to a predetermined number, said means including means in response to said number for deleting the earliest plot data appearing on said radar indicator.

12. A radar plotting system in accordance with claim 11 which includes means for assigning to the plot data a characteristic mark to identify the earliest plot data appearing on said radar indicator.

13. A radar plotting system of claim 12 which includes means for storing in the second memory a number corresponding to the characteristic mark together with the plot data; and means acting in response to said number to delete said earliest plot data from a selected zone on said radar indicator.

14. The system of claim 11 which includes means for reducing the scan number by the number of sets of plot data which have been dropped.

15. A radar plotting system for use with a PPI radar producing digitized target pulses at a plurality of ranges and azimuths, said target plotting system comprising:

means for transmitting radar pulse signals at a first rate;

means for digitally storing in a first memory at a first rate range and azimuth target data corresponding to range and azimuth coordinate data;

means for shuffling said digitally stored range and azimuth target data to provide a range and azimuth sequence corresponding to that of real time sequence of range sweep and azimuth scans of a PPI; and means for comparing digitally said stored range and azimuth target data with current range and azimuth data in which equality of digital values in range and azimuth provide a plot video pulse at a second rate being less than or equal to said first rate in accordance with a selected range for said radar, said first rate being a variable in accordance with said radar range setting.

* * * * *